US012656871B2

(12) United States Patent
Nakao

(10) Patent No.: US 12,656,871 B2
(45) Date of Patent: Jun. 16, 2026

(54) ELECTRICAL DEVICE AND METHOD FOR CONTROLLING VIBRATION

(71) Applicant: KYOCERA Corporation, Kyoto (JP)

(72) Inventor: Fumiaki Nakao, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 110 days.

(21) Appl. No.: 18/690,612

(22) PCT Filed: Sep. 1, 2022

(86) PCT No.: PCT/JP2022/033036
§ 371 (c)(1),
(2) Date: Mar. 8, 2024

(87) PCT Pub. No.: WO2023/037968
PCT Pub. Date: Mar. 16, 2023

(65) Prior Publication Data
US 2024/0377889 A1 Nov. 14, 2024

(30) Foreign Application Priority Data

Sep. 9, 2021 (JP) ................................. 2021-147097

(51) Int. Cl.
*H04B 3/36* (2006.01)
*G06F 3/01* (2006.01)
(52) U.S. Cl.
CPC .................................... *G06F 3/016* (2013.01)

(58) Field of Classification Search
CPC ........ G06F 3/016; G06F 3/0416; G06F 3/041; H03K 17/9625
See application file for complete search history.

(56) References Cited

U.S. PATENT DOCUMENTS

| | | | | |
|---|---|---|---|---|
| 9,489,047 B2 * | 11/2016 | Jiang | ..................... | H10N 30/204 |
| 9,891,708 B2 * | 2/2018 | Cruz-Hernandez | ..... | G06F 3/016 |
| 10,528,140 B2 | 1/2020 | Yamazaki et al. | | |
| 10,748,389 B2 * | 8/2020 | Khoshkava | .......... | F16F 15/005 |
| 11,728,756 B2 | 8/2023 | Ishitani et al. | | |
| 2006/0290662 A1 * | 12/2006 | Houston | .................. | A63F 13/24 345/156 |
| 2013/0215079 A1 * | 8/2013 | Johnson | .................. | G06F 3/016 345/174 |
| 2013/0307789 A1 * | 11/2013 | Karamath | ............... | G06F 3/016 345/173 |

FOREIGN PATENT DOCUMENTS

| | | |
|---|---|---|
| JP | 4633167 B2 | 2/2011 |
| JP | 2018-195124 A | 12/2018 |
| JP | 2021-058863 A | 4/2021 |

* cited by examiner

*Primary Examiner* — Toan N Pham
(74) *Attorney, Agent, or Firm* — Studebaker Brackett PLLC

(57) ABSTRACT

An electrical device includes a vibrator and a controller. When receiving an electrical signal, the vibrator vibrates a vibration target. The controller inputs a first electrical pulse to the vibrator. Pulse width of the first electrical pulse is a period of time from the input of the first electrical pulse to the vibrator until displacement of the vibration target becomes maximum. After inputting the first electrical pulse, the controller inputs a second electrical pulse to the vibrator in such a way as to offset the vibration of the vibration target.

10 Claims, 15 Drawing Sheets

VOLTAGE

DISPLACEMENT

FIRST VOLTAGE PULSE P3

V2

(1/2)T2 t0 t7

TIME

VIBRATION WAVEFORM WA13

VOLTAGE

DISPLACEMENT

COMPOSITE PULSE S7

SECOND VOLTAGE PULSE P4

FIRST
VOLTAGE
PULSE P3

VIBRATION
WAVEFORM WA14 t8 t0

TIME

T2

ELECTRICAL DEVICE AND METHOD FOR CONTROLLING VIBRATION

CROSS-REFERENCE TO RELATED APPLICATIONS

The present application claims priority to Japanese Patent Application No. 2021-147097 filed in the Japan Patent Office on Sep. 9, 2021, the entire contents of which are incorporated herein by reference.

TECHNICAL FIELD

The present disclosure relates to an electrical device and a method for controlling vibration.

BACKGROUND OF INVENTION

Techniques for presenting tactile sensations to users are known. An input device described in Patent Literature 1 controls driving of a vibration unit in such a way as to vibrate an input unit at a constant frequency, in order to present a clicking feel to an object that is pressing the input unit.

CITATION LIST

Patent Literature

Patent Literature 1: Japanese Patent No. 4633167

SUMMARY

In an embodiment of the present disclosure, an electrical device includes a vibrator and a controller. When receiving an electrical signal, the vibrator vibrates a vibration target. The controller inputs a first electrical pulse to the vibrator. Pulse width of the first electrical pulse is a period of time from the input of the first electrical pulse to the vibrator until displacement of the vibration target becomes maximum. After inputting the first electrical pulse, the controller inputs a second electrical pulse to the vibrator in such a way as to offset the vibration of the vibration target.

In another embodiment of the present disclosure, a method for controlling vibration includes inputting a first electrical pulse to a vibrator that, when receiving an electrical signal, vibrates a vibration target and inputting, after inputting the first electrical pulse, a second electrical pulse to the vibrator in such a way as to offset the vibration of the vibration target. Pulse width of the first electrical pulse is a period of time from the input of the first electrical pulse to the vibrator until displacement of the vibration target becomes maximum.

DESCRIPTION OF EMBODIMENTS

Figure 1:
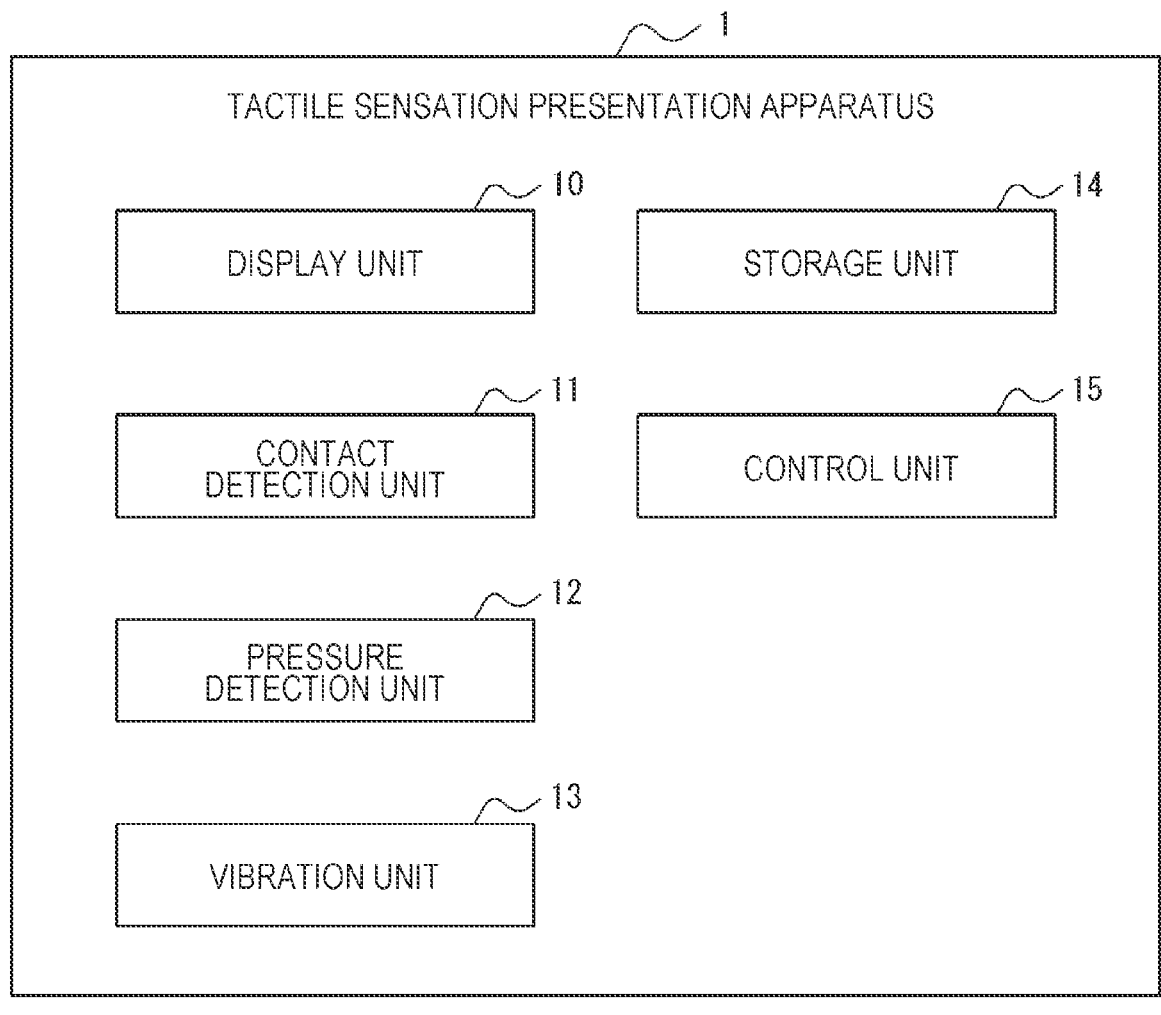
FIG. 1 is a block diagram illustrating a schematic configuration of a tactile sensation presentation apparatus according to an embodiment of the present disclosure.

Conventional techniques can still be improved in terms of vibration control. According to the present disclosure, an electrical device and a method for controlling vibration with improved control of vibration can be provided.

In an embodiment of the present disclosure, the electrical device in the present disclosure will be described as a tactile sensation presentation apparatus. The electrical device in the present disclosure, however, is not limited to the tactile sensation presentation apparatus. The electrical device in the present disclosure may be any device.

The embodiment of the present disclosure will be described hereinafter with reference to the drawings. Among components illustrated in the following drawings, the same components will be given the same reference numerals.

FIG. 1 is a block diagram illustrating a schematic configuration of a tactile sensation presentation apparatus 1 according to the embodiment of the present disclosure. The tactile sensation presentation apparatus 1 presents a tactile sensation to a user by vibrating an operation surface (vibration target).

The tactile sensation presentation apparatus 1 may be configured as any device. In an example, the tactile sensation presentation apparatus 1 may be configured as a vehicle device such as an automotive navigation system or a switch of a steering wheel or a power window. In another example, the tactile sensation presentation apparatus 1 may be configured as a mobile phone, a smartphone, a tablet PC (personal computer), a laptop PC, or the like. In yet another example, the tactile sensation presentation apparatus 1 may be configured as a desktop PC, a home appliance, a factory automation (FA) device, a dedicated terminal, or one of various other electronic devices. The tactile sensation presentation apparatus 1, however, is not limited to these.

The tactile sensation presentation apparatus 1 includes a display unit 10, a contact detection unit 11, a pressure detection unit 12, a vibration unit 13, a storage unit 14, and a control unit 15.

The display unit 10 displays any information. The display unit 10 displays, for example, operation objects. When the tactile sensation presentation apparatus 1 is configured as a smartphone, for example, the display unit 10 displays an operation object for telephone, mail, a browser, a camera, or the like. In another example, when the tactile sensation presentation apparatus 1 is configured as a vehicle device, the display unit 10 displays an operation object for navigation, audio, air conditioning, or the like.

The display unit 10 includes, for example, at least one display. The display may be an LCD (liquid crystal display), an organic EL (electroluminescence) display, or the like.

The contact detection unit 11 detects contact of objects with the operation surface of the tactile sensation presentation apparatus 1. The operation surface is a touch surface 31a in FIGS. 2 and 3, which will be referred to later. The user uses the operation surface. The user uses the operation surface by touching the operation surface with an object such as one of his/her fingers or a stylus pen.

Any method may be employed as a detection method used by the contact detection unit 11 to detect contact of objects with the operation surface. Examples of the detection method used by the contact detection unit 11 include a capacitive method, a resistive method, a surface acoustic wave method (or an ultrasonic method), an infrared method, an electromagnetic induction method, and a load detection method.

The pressure detection unit 12 detects pressure on the operation surface of the tactile sensation presentation apparatus 1. Pressure is caused on the operation surface when the user presses the operation surface with his/her finger, a stylus pen, or the like.

The pressure detection unit 12 includes, for example, an element that linearly reacts to pressure. The element that linearly reacts to pressure is, for example, a strain gauge sensor, a piezoelectric element, or the like whose physical or electrical property (e.g., strain, resistance, voltage, etc.) changes in response to pressure.

When an electrical signal is input, the vibration unit 13 vibrates the operation surface of the tactile sensation presentation apparatus 1. The electrical signal input to the vibration unit 13 may be a voltage signal or a current signal. When the electrical signal is a voltage signal, the vibration unit 13 includes, for example, a piezoelectric element or the like. When the electrical signal is a current signal, the vibration unit 13 includes, for example, a magnetostrictive element, an electromagnetic actuator, a current-driven motor, or the like. The electromagnetic actuator is, for example, a solenoid, a voice coil, or the like. The current-driven motor is, for example, a servomotor, a stepping motor, or the like.

The storage unit 14 includes at least one semiconductor memory, at least one magnetic memory, at least one optical memory, or a combination of at least two of these. The semiconductor memory is, for example, a RAM (random-access memory), a ROM (read-only memory), or the like. The RAM is, for example, an SRAM (static random-access memory), a DRAM (dynamic random-access memory), or the like. The ROM is, for example, an EEPROM (electrically erasable programmable read-only memory) or the like. The storage unit 14 may function as a main storage device, an auxiliary storage device, or a cache memory. The storage unit 14 stores data used for operation of the tactile sensation presentation apparatus 1 and data obtained as a result of the operation of the tactile sensation presentation apparatus 1. For example, the storage unit 14 stores system programs, application programs, built-in software, and the like.

The control unit 15 includes at least one processor, at least one dedicated circuit, or a combination of these. The processor is a general-purpose processor such as a CPU (central processing unit) or a GPU (graphics processing unit) or a dedicated processor specialized in a certain type of processing. The dedicated circuit is, for example, an FPGA (field-programmable gate array), an ASIC (application-specific integrated circuit), or the like. The control unit 15 performs processing relating to the operation of the tactile sensation presentation apparatus 1 while controlling components of the tactile sensation presentation apparatus 1.

Figure 2:
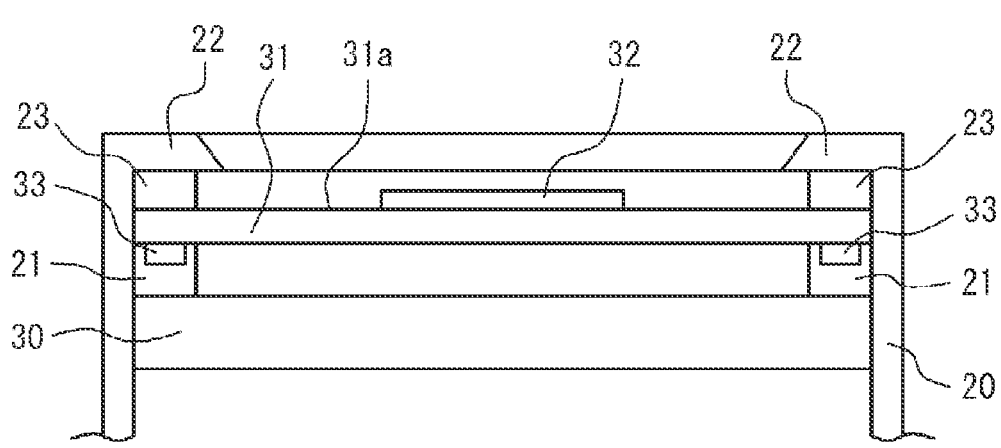
FIG. 2 is a key component cross-sectional view illustrating an example of an implementation structure of the tactile sensation presentation apparatus illustrated in FIG. 1.
Figure 3:
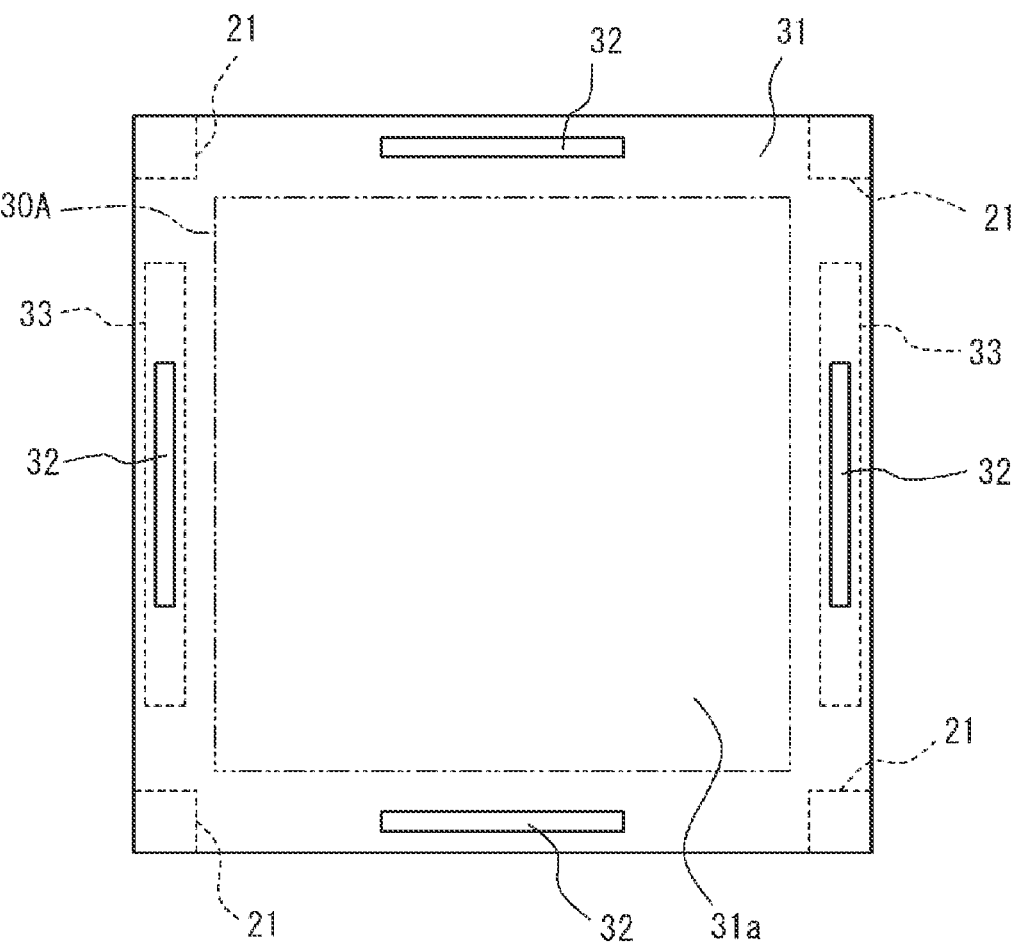
FIG. 3 is a key component plan view illustrating the example of the implementation structure of the tactile sensation presentation apparatus illustrated in FIG. 1.

FIG. 2 is a key component cross-sectional view illustrating an example of an implementation structure of the tactile sensation presentation apparatus 1 illustrated in FIG. 1. FIG. 3 is a key component plan view illustrating the example of the implementation structure of the tactile sensation presentation apparatus 1 illustrated in FIG. 1. In the example illustrated in FIGS. 2 and 3, the tactile sensation presentation apparatus 1 includes a housing 20, first insulators 21, an upper cover 22, second insulators 23, a display 30, a touch sensor 31, strain gauge sensors 32, and piezoelectric elements 33. In FIG. 3, broken lines indicate positions of the first insulators 21 and the piezoelectric elements 33. FIG. 3 illustrates a configuration from which the housing 20, the upper cover 22, and the second insulators 23 have been removed.

As illustrated in FIG. 2, the housing 20 holds the display 30 inside thereof. The display 30 holds the touch sensor 31 via the first insulators 21.

As illustrated in FIG. 2, the housing 20 is provided with the upper cover 22. The upper cover 22 covers an edge area of the touch sensor 31. The edge area of the touch sensor 31 covered by the upper cover 22 is an area of the display 30 outside a display area 30A illustrated in FIG. 3. The second insulators 23 are located between the upper cover 22 and the touch sensor 31.

The first insulators 21 include elastic members. As illustrated in FIG. 3, the four first insulators 21 are located at four corners outside the display area 30A of the display 30.

The second insulators 23 include elastic members. As with, or similarly to, the four first insulators 21 illustrated in FIG. 3, the four second insulators 23 are located at the four corners outside the display area 30A of the display 30.

As illustrated in FIG. 3, the display 30 has a square shape. The display 30 includes the square display area 30A. The display 30 and the display area 30A, however, may have any shapes that suit specifications of the tactile sensation presentation apparatus 1. The display unit 10 illustrated in FIG. 1 may include the display 30.

As illustrated in FIG. 3, the touch sensor 31 has a square shape. The touch sensor 31, however, may have any shape that suits the specifications of the tactile sensation presentation apparatus 1.

The touch sensor 31 includes a front surface member and a back surface member. The front surface member includes the touch surface 31*a*. The front surface member is composed of, for example, a transparent film, glass, or the like. The back surface member is composed of, for example, glass, acrylic, or the like. As the touch sensor 31, a touch sensor having a structure whose front surface member, when the touch surface 31*a* is pressed, bends (distorts) by a minute amount in response to pressure is used. The contact detection unit 11 illustrated in FIG. 1 may include the touch sensor 31.

As illustrated in FIG. 2, the strain gauge sensors 32 are located on a front surface of the touch sensor 31. The strain gauge sensors 32 are located near sides of the front surface of the square touch sensor 31 covered by the upper cover 22. The strain gauge sensors 32 detect pressure applied to the touch sensor 31. The strain gauge sensors 32 may be provided on the front surface of the touch sensor 31 by adhesion or the like. The pressure detection unit 12 illustrated in FIG. 1 may include four strain gauge sensors 32.

As illustrated in FIG. 2, the piezoelectric elements 33 are located on a back surface of the touch sensor 31. The two piezoelectric elements 33 may be located near two opposite sides of the square touch sensor 31. The piezoelectric elements 33 may be provided on the back surface of the touch sensor 31 by adhesion or the like. The vibration unit 13 illustrated in FIG. 1 may include two piezoelectric elements 33. The piezoelectric elements 33 may be configured to vibrate the touch surface 31*a* in a direction parallel to the touch surface 31*a* or a direction intersecting with the touch surface 31*a*. Vibration in the direction parallel to the touch surface 31*a* is called "horizontal vibration". Vibration in the direction intersecting with the touch surface 31*a* is called "vertical vibration".

Process for Presenting Tactile Sensation

A principle of a method for presenting a tactile sensation is described in Japanese Patent No. 4633167 of Patent Literature 1. As described in Patent Literature 1, a general pushbutton switch has load characteristics illustrated in FIG. 4.

Figure 4:
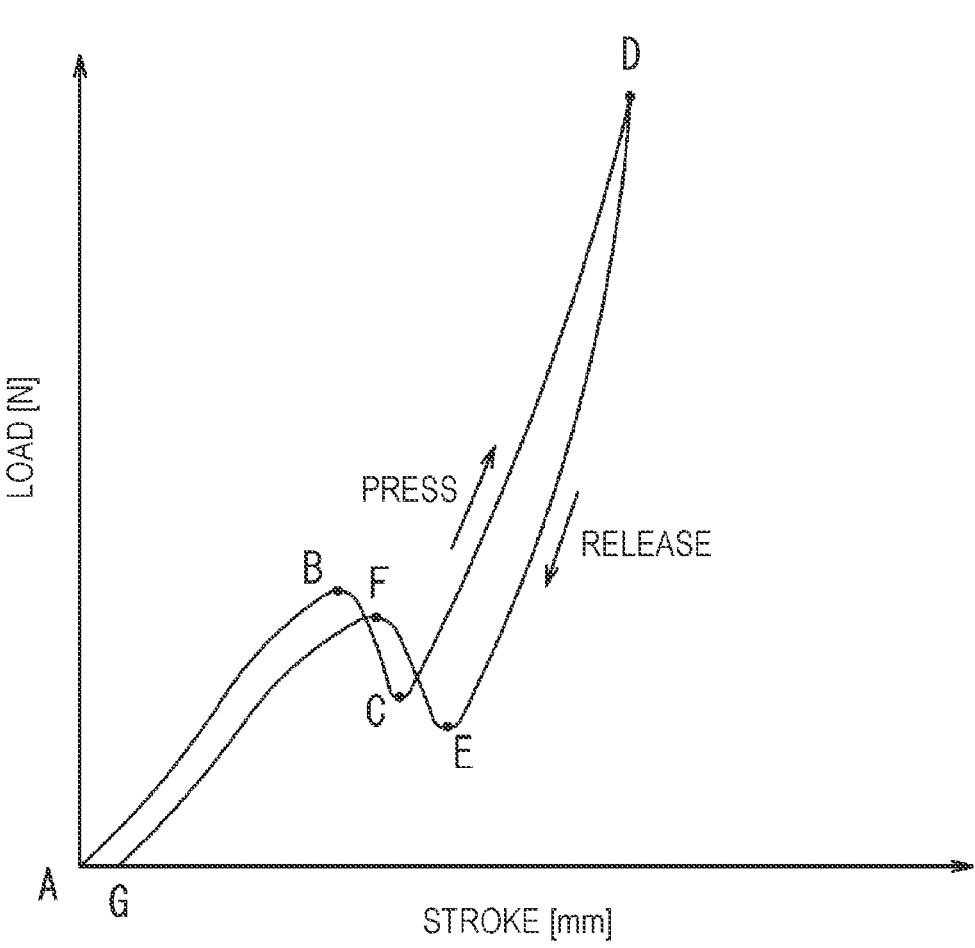
FIG. 4 is a diagram illustrating load characteristics of a general pushbutton switch.

FIG. 4 is a diagram illustrating load characteristics of a general pushbutton switch. In FIG. 4, a horizontal axis represents a stroke [mm] of the pushbutton switch. A vertical axis represents a load [N] on the pushbutton switch.

A load characteristic of the pushbutton switch during pushing is observed in a period from point A to point D. A period from point A to point B is a period where the load increases substantially in proportion to the stroke of the pushbutton switch after the pushing of the pushbutton switch starts. A period from point B to point C is a period where the load sharply decreases. In the period from point B to point C, the pushing of the pushbutton switch causes a convex-shaped elastic member such as a metal dome to buckle, resulting in a sudden decrease in the load. In a period from point C to point D, the load increases substantially in proportion to the stroke of the pushbutton switch. In the period from point C to point D, a contact of the switch closes, and the load increases substantially in proportion to the stroke of the pushbutton switch.

A load characteristic of the pushbutton switch during releasing is observed in a period from point D to point G. The load characteristic during releasing has some hysteresis, but follows opposite changes from the load characteristic during pushing. A period from point D to point E is a period where the load decreases substantially in proportion to the stroke of the pushbutton switch after the releasing of the pushbutton switch starts. In the period from point D to point E, the contact of the switch remains closed. A period from point E to point F is a period where the load sharply increases. In the period from point E to point F, the releasing of the pushbutton switch causes the elastic member to return from the buckling to a convex shape, resulting in a sudden increase in the load. As the period from point E to point F begins, the contact of the switch opens. A period from point F to point G is a period where the load decreases substantially in proportion to the stroke of the pushbutton switch. The period from point F to point G is a period from the return of the elastic member until the user removes his/her finger from the pushbutton switch.

As described in Patent Literature 1, when pushing the pushbutton switch, the user receives vibration stimulation for a short period of time, such as about one period, at point B illustrated in FIG. 4. When releasing the pushbutton switch, the user receives vibration stimulation for a short period of time, such as about one period, at point F illustrated in FIG. 4. That is, in order to present a clicking feel to the user, the operation surface of the tactile sensation presentation apparatus 1 vibrates to give vibration stimulation to the user for a short period of time, such as about one period, at points B and F illustrated in FIG. 4. In other periods, the user voluntarily presses or releases an operation button displayed on the tactile sensation presentation apparatus 1 to stimulate the user's sense of pressure. With this configuration, a clicking feel can be presented to the user.

In the present embodiment, when the control unit 15 detects contact of an object with the operation surface using the contact detection unit 11, the control unit 15 detects pressure on the operation surface using the pressure detection unit 12. The control unit 15 then determines whether the pressure on the operation surface detected using the pressure detection unit 12 satisfies a set criterion. The set criterion may be set on the basis of a pushing load applied to a button switch or the like when the user uses the button switch or the like. For example, the set criterion may be set on the basis of pushing loads at points B and F illustrated in FIG. 4.

If determining that pressure on the operation surface detected using the pressure detection unit 12 satisfies the set criterion, the control unit 15 inputs a first electrical pulse to the vibration unit 13. Pulse width of the first electrical pulse is a period of time from the input of the first electrical pulse to the vibration unit 13 until displacement of the operating surface reaches its maximum value. By inputting the first electrical pulse to the vibration unit 13, stronger vibration stimulation than when, for example, an electrical pulse having a pulse width different from that of the first electrical pulse is input to the vibration unit 13 can be given to the user.

The vibration unit 13 will be described hereinafter as being configured to vibrate the operation surface of the tactile sensation presentation apparatus 1 when a voltage signal is input as an electrical signal. In the following description, the control unit 15 inputs a voltage pulse to the vibration unit 13 as an electrical pulse. The vibration unit 13, however, may be configured to vibrate the operation surface of the tactile sensation presentation apparatus 1 when a current signal is input as an electrical signal, instead. In this case, the control unit 15 may input a current pulse to the vibration unit 13 as an electrical pulse.

Figure 5:
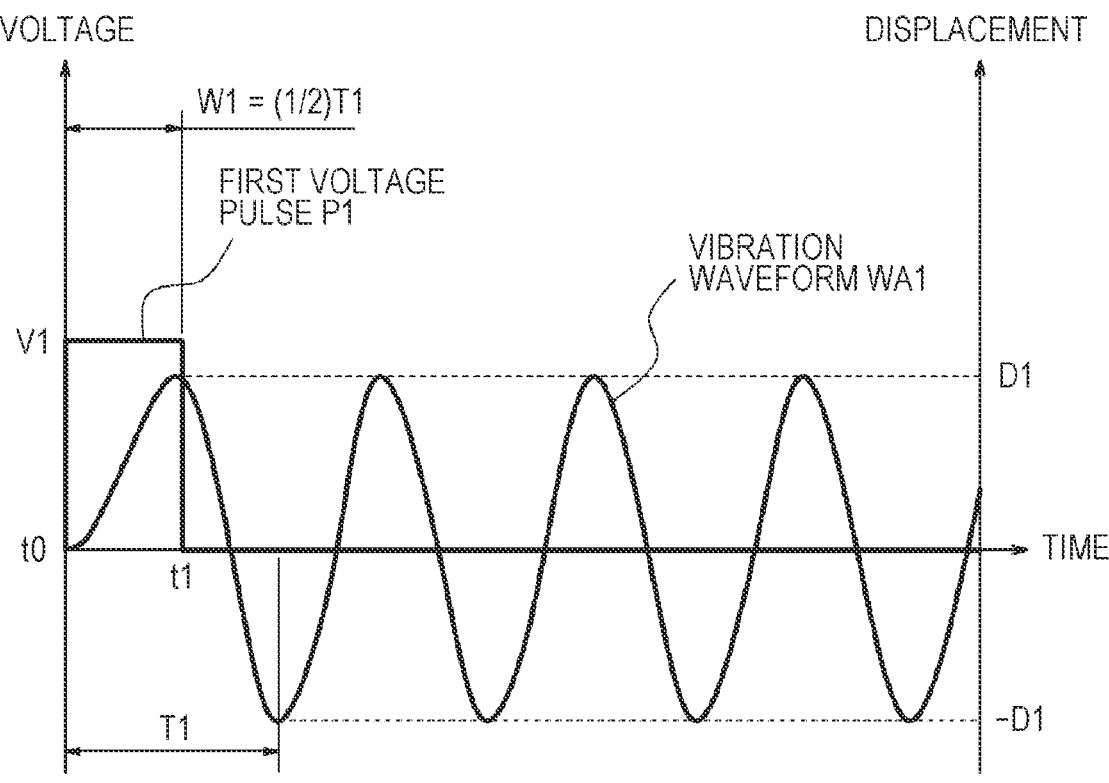
FIG. 5 is a diagram illustrating a first voltage pulse according to the embodiment of the present disclosure.

FIG. 5 is a diagram illustrating a first voltage pulse P1 according to the embodiment of the present disclosure. In FIG. 5, a horizontal axis represents time. A left vertical axis represents voltage input to the vibration unit 13. A right vertical axis represents displacement of the operation surface of the tactile sensation presentation apparatus 1. The displacement of the operation surface is, for example, displacement in a direction perpendicular to the operation surface.

The first voltage pulse P1 has a pulse width W1. The pulse width W1 is a period of time half as long as a natural period T1. The first voltage pulse P1 has a height V1. V1 denotes a positive voltage. The first voltage pulse P1 has a rectangular shape.

The natural period T1 is a natural period of a vibration system including the operation surface. When the vibration unit 13 forcibly vibrates the operation surface, for example, the operation surface vibrates freely with the natural period T1. The natural period T1 is determined on the basis of structure of the vibration system including the operation surface, that is, for example, the structure of the tactile sensation presentation apparatus 1.

The control unit 15 begins to input the first voltage pulse P1 to the vibration unit 13 at a time t0. The control unit 15 stops inputting the first voltage pulse P1 to the vibration unit 13 at a time t1. The time t1 is a point in time when half the natural period T1 has elapsed since the time t0.

When the first voltage pulse P1 is input to the vibration unit 13, the displacement of the operation surface changes as indicated by a vibration waveform WA1. A period of the vibration waveform WA1 is the natural period T1. A maximum value of the vibration waveform WA1 is D1. D1 is a positive value. A minimum value of the vibration waveform WA1 is –D1. –D1 is a negative value. The vibration waveform WA1 reaches the maximum value at the time t1.

Since the pulse width W1 is a period of time half as long as the natural period T1, the pulse width W1 is a period of time from the time t0 to the time t1. That is, the pulse width W1 is a period of time from the input of the first voltage pulse P1 to the vibration unit 13 until the displacement of the operation surface reaches its maximum value.

By inputting the first voltage pulse P1 to the vibration unit 13, the driving of the vibration unit 13 stops when the vibration waveform WA1 reaches the maximum value D1. Since the driving of the vibration unit 13 stops when the vibration waveform WA1 reaches the maximum value D1, the vibration waveform WA1 reaches the minimum value –D1. Since the vibration waveform WA1 reaches the minimum value –D1, amplitude of the vibration waveform WA1 becomes 2×D1[=D1–(–D1)]. With this configuration, stronger vibration stimulation than when a voltage pulse having a pulse width different from the pulse width W1 is input to the vibration unit 13, for example, can be given to the user. This effect can be described with reference to FIG. 6.

Figure 6:
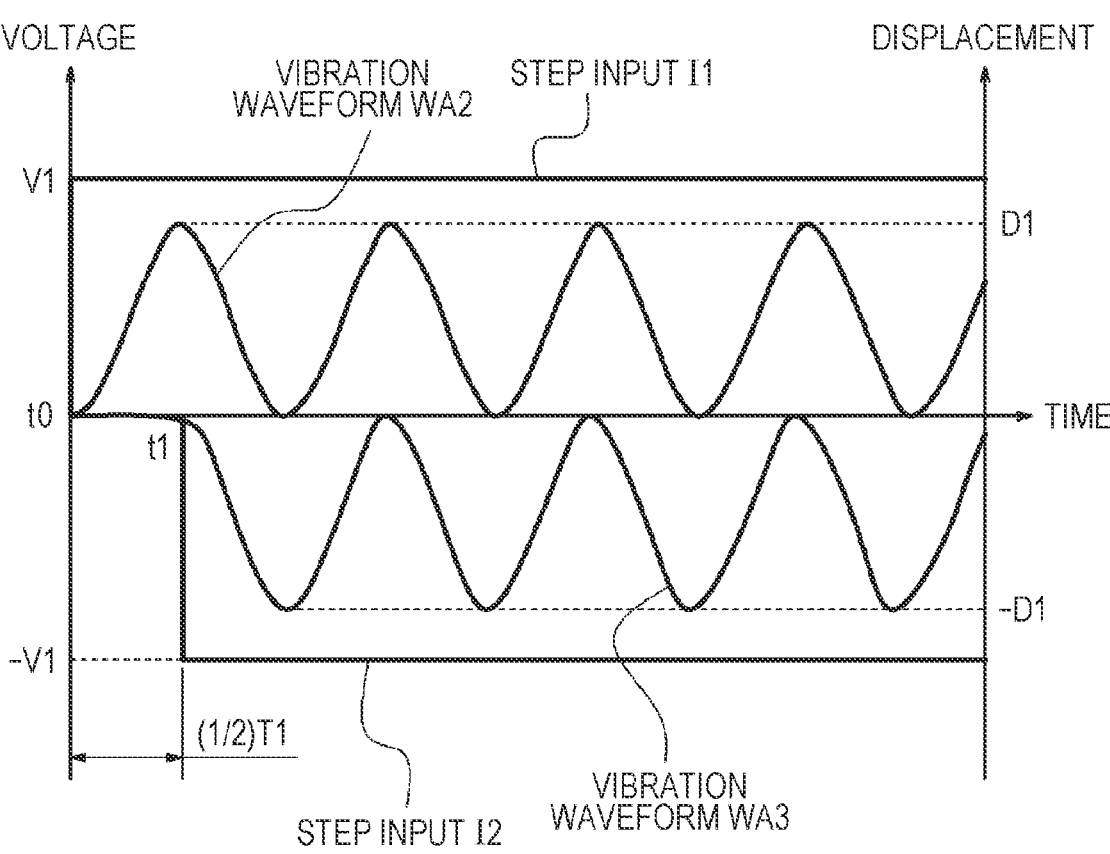
FIG. 6 is a diagram obtained by decomposing the first voltage pulse illustrated in FIG. 5.

FIG. 6 is a diagram obtained by decomposing the first voltage pulse P1 illustrated in FIG. 5. The first voltage pulse P1 illustrated in FIG. 5 can be decomposed into a step input I1 and a step input I2. A horizontal axis, a left vertical axis, and a right vertical axis in FIG. 6 are the same as those in FIG. 5.

The step input I1 rises to V1 at the time t0. A time at which the step input I1 rises corresponds to a time at which the first voltage pulse P1 illustrated in FIG. 5 rises. When the step input I1 is input to the vibration unit 13, the displacement of the operation surface changes as indicated by a vibration waveform WA2. A phase of the vibration waveform WA2 is determined on the basis of the time at which the step input I1 rises. A period of the vibration waveform WA2 is the natural period T1. A maximum value of the vibration waveform WA2 is D1. A minimum value of the vibration waveform WA2 is zero. Amplitude of the vibration waveform WA2 is D1.

The step input I2 falls to –V1 at the time t1. A time at which the step input I2 falls corresponds to a time at which the first voltage pulse P1 illustrated in FIG. 5 falls. The time t1 is a point in time at which half the natural period T1 has elapsed since the time t0. When the step input I2 is input to the vibration unit 13, the displacement of the operation surface changes as indicated by the vibration waveform WA3. A phase of the vibration waveform WA3 is determined on the basis of the time at which the step input I2 falls. A period of the vibration waveform WA3 is the natural period T1. A maximum value of the vibration waveform WA3 is zero. A minimum value of the vibration waveform WA3 is –D1. Amplitude of the vibration waveform WA3 is D1.

The vibration waveform WA1 illustrated in FIG. 5 is obtained by combining together the vibration waveform WA2, whose phase is determined on the basis of the step input I2, and the vibration waveform WA3, whose phase is determined on the basis of the step input I2.

Here, a period of time from the rise of the step input I1, that is, the time t0, to the fall of the step input I2, that is, the time t1, is half as long as the natural period T1. Since the period of time from the time t0 to the time t1 is half as long as the natural period T1, the vibration waveform WA2 and the vibration waveform WA3 become, after the time t1, different from each other by an amount of phase shift corresponding to half the natural period T1. With this configuration, the vibration waveform WA2 and the vibration waveform WA3 strengthen each other after the time t1. For example, a time at which the vibration waveform WA2 reaches the maximum value D1 and a time at which the vibration waveform WA3 reaches its maximum value, namely zero, are the same. After the time t1, a time at which the vibration waveform WA2 reaches its minimum value, namely zero, and a time at which the vibration waveform WA3 reaches the minimum value –D1 becomes the same. With this configuration, the amplitude of the vibration waveform WA1, which is the combination of the vibration waveform WA2 and the vibration waveform WA3, becomes 2×D1 after the time t1. That is, the amplitude of the vibration waveform WA1 is twice as large as that of the vibration waveform WA2 and the vibration waveform WA3, namely D1. Since the amplitude of the vibration waveform WA1 is twice as large as that of the vibration waveform WA2 and the vibration waveform WA3, strong vibration stimulation can be given to the user.

Strong vibration stimulation, therefore, can be given to the user when the control unit 15 inputs the first voltage pulse to the vibration unit 13.

After inputting the first voltage pulse, the control unit 15 inputs a second voltage pulse to the vibration unit 13 as a second electrical pulse in such a way as to offset the vibration of the operation surface. By inputting the second voltage pulse to the vibration unit 13, a period of time for which vibration stimulation is given to the user can be shortened compared to, for example, when the second voltage pulse is not input to the vibration unit 13.

Polarity of the second voltage pulse may be the same as that of the first voltage pulse. The polarity of the second voltage pulse may be opposite that of the first voltage pulse.

Polarity of a voltage pulse is, for example, a direction in which the voltage pulse changes, namely a positive voltage or a negative voltage.

When the polarity of the second voltage pulse is the same as that of the first voltage pulse, the control unit 15 may, as will be described with reference to FIG. 7, input a composite pulse, which is a combination of the first voltage pulse and the second voltage pulse, to the vibration unit 13.

Figure 7:
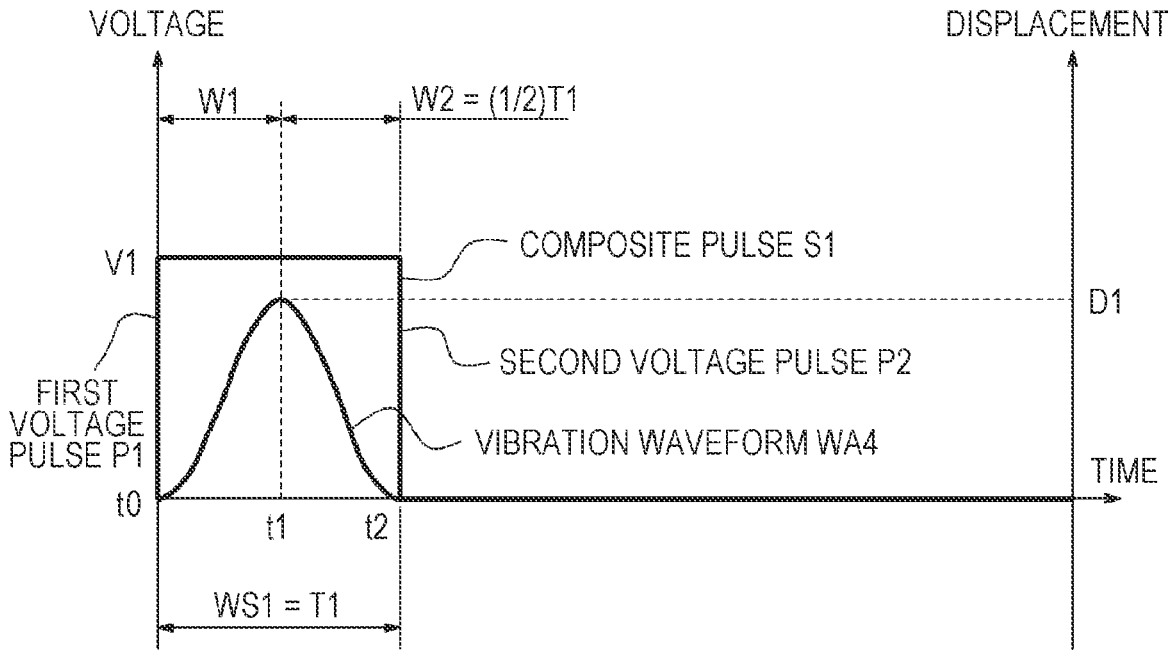
FIG. 7 is a diagram illustrating an example of a composite pulse according to the embodiment of the present disclosure.

FIG. 7 is a diagram illustrating an example of a composite pulse S1 according to the embodiment of the present disclosure. A horizontal axis, a left vertical axis, and a right vertical axis in FIG. 7 are the same as those in FIG. 5.

The composite pulse S1 is a combination of the first voltage pulse P1 and a second voltage pulse P2. The composite pulse S1 is configured as a single pulse. The second voltage pulse P2 has a pulse width W2. The pulse width W2 is a period of time half as long as the natural period T1. Polarity of the second voltage pulse P2 is the same as that of the first voltage pulse P1. The second voltage pulse P2 has the height V1 as with the first voltage pulse P1. The second voltage pulse P2 has a rectangular shape. The shape of the second voltage pulse P2 is the same as that of the first voltage pulse P1.

The composite pulse S1 has a pulse width WS1. The pulse width WS1 is a combination of the pulse width W1 of the first voltage pulse P1 and the pulse width W1 of the second voltage pulse P2. The pulse width WS1 is the same as the natural period T1. The composite pulse S1 has the height V1. The composite pulse S1 has a rectangular shape.

The control unit 15 begins to input the composite pulse S1 to the vibration unit 13 at the time t0. The control unit 15 stops inputting the composite pulse S1 to the vibration unit 13 at a time t2. The time t2 is a point in time when a period of time as long as the natural period T1 has elapsed since the time t0.

When the composite pulse S1 is input to the vibration unit 13, the displacement of the operation surface changes as indicated by a vibration waveform WA4. A maximum value of the vibration waveform WA4 is D1. A minimum value of the vibration waveform WA4 is zero.

Since the pulse width WS1 is the same period of time as the natural period T1, the driving of the vibration unit 13 stops when displacement of the vibration waveform WA4 becomes zero, namely at the time t2. Since the driving of the vibration unit 13 stops when the displacement of the vibration waveform WA4 becomes zero, the displacement of the operation surface also stops when becoming zero. With this configuration, the period of time for which vibration stimulation is given to the user can be shortened to a period of time substantially equal to the natural period T1. This effect can also be described with reference to FIG. 8.

Figure 8:
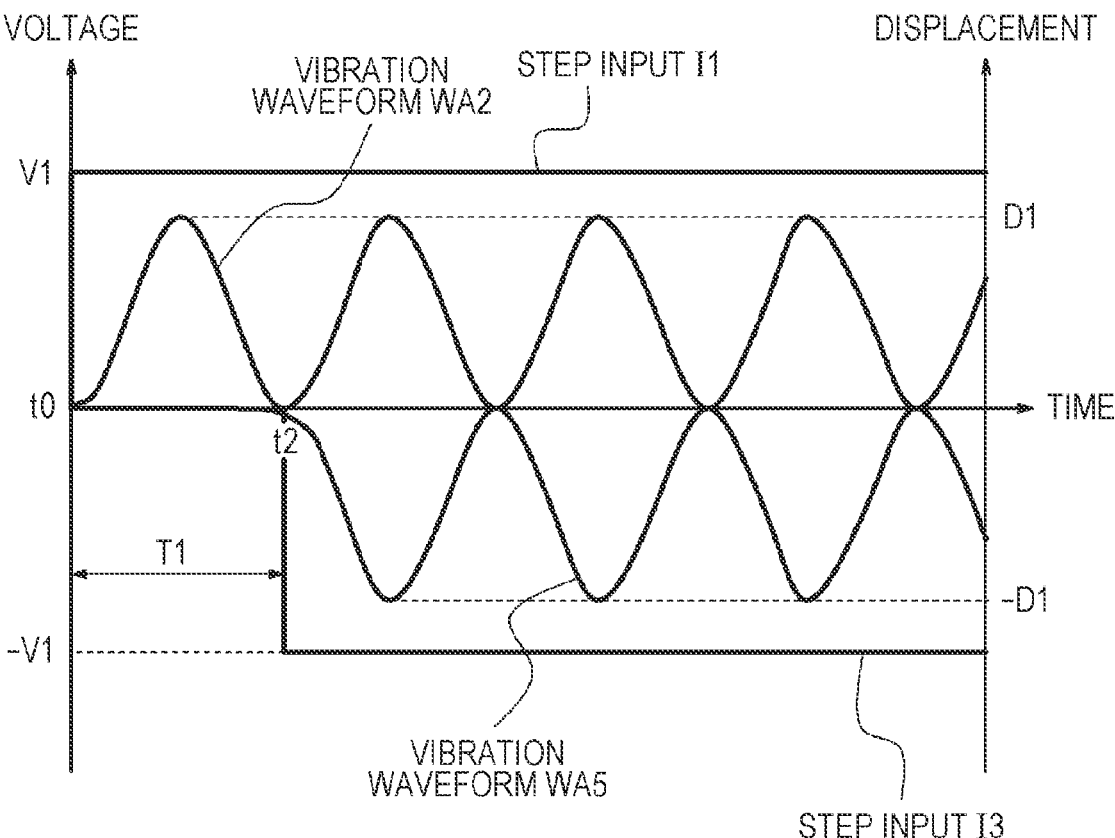
FIG. 8 is a diagram obtained by decomposing the composite pulse illustrated in FIG. 7.

FIG. 8 is a diagram obtained by decomposing the composite pulse S1 illustrated in FIG. 7. The composite pulse S1 illustrated in FIG. 7 can be decomposed into the step input I1 and a step input I3. A horizontal axis, a left vertical axis, and a right vertical axis in FIG. 8 are the same as those in FIG. 5.

The step input I1 is as described above with reference to FIG. 6. When the step input I1 is input to the vibration unit 13, the displacement of the operation surface changes as indicated by the vibration waveform WA2 as described above with reference to FIG. 6.

The step input I3 falls to −V1 at the time t2. A time at which the step input I3 falls corresponds to a time at which the composite pulse S1 illustrated in FIG. 7 falls. When the step input I3 is input to the vibration unit 13, the displacement of the operation surface changes as indicated by a vibration waveform WA5. A phase of the vibration waveform WA5 is determined on the basis of the time at which the step input I3 falls. A period of the vibration waveform WA5 is the natural period T1. A maximum value of the vibration waveform WA5 is zero. A minimum value of the vibration waveform WA5 is −D1. Amplitude of the vibration waveform WA5 is D1.

The vibration waveform WA4 illustrated in FIG. 7 is a combination of the vibration waveform WA2, whose phase is determined on the basis of the step input I1, and the vibration waveform WA5, whose phase is determined on the basis of the step input I3.

Here, a period of time from the rise of the step input I1, that is, the time t0, to the fall of the step input I3, that is, the time t2, is equal to the natural period T1. Since the period of time from the time t0 to the time t2 is equal to the natural period T1, the vibration waveform WA2 and the vibration waveform WA5 become, after the time t2, different from each other by an amount of phase shift corresponding to the natural period T1. With this configuration, the vibration waveform WA2 and the vibration waveform WA5 cancel each other after the time t2. For example, a time at which the vibration waveform WA2 reaches the maximum value D1 and a time at which the vibration waveform WA5 reaches the minimum value −D1 are the same. Since the vibration waveform WA2 and the vibration waveform WA5 cancel each other after the time t2, amplitude of the vibration waveform WA4, which is the combination of the vibration waveform WA2 and the vibration waveform WA5, converges to zero.

The period of time for which vibration stimulation is given to the user, therefore, can be shortened to about a period of time equal to the natural period T1 when the control unit 15 inputs the composite pulse S1 to the vibration unit 13.

The composite pulse S1 has been described herein as a combination of the first voltage pulse P1 and the second voltage pulse P2 as illustrated in FIG. 7 for the sake of description. Here, as illustrated in FIG. 7, the composite pulse S1 configured as a single pulse has a linear symmetrical shape with the time t1, at which the vibration waveform WA4 reaches its maximum value, as an axis of symmetry in the graph including the axis representing time and the axis representing voltage input to the vibration unit 13. That is, when a voltage pulse having a linear symmetrical shape with a time at which a vibration waveform indicating the displacement of the operation surface reaches its maximum value as an axis of symmetry is input to the vibration unit 13, the effect produced in the present disclosure can be produced even if the voltage pulse is not a combination of two voltage pulses.

The shape of the composite pulse is not limited to a rectangular shape illustrated in FIG. 7. The composite pulse may have any shape. When the pulse does not have a rectangular shape, the pulse width may be defined in any manner insofar as the pulse width is uniquely determined. For example, the pulse width may be defined as a period of time from a rising edge (or a falling edge) of the pulse to a falling edge (or a rising edge) of the pulse. A rising edge of a pulse is, for example, a time at which voltage of the pulse rises to half the height of the pulse. A falling edge of a pulse is, for example, is a time at which voltage of the pulse falls to half the height of the pulse.

As described with reference to FIG. 9, the control unit 15 may input a sinusoidal composite pulse S2 to the vibration unit 13 as another example of the composite pulse.

Figure 9:
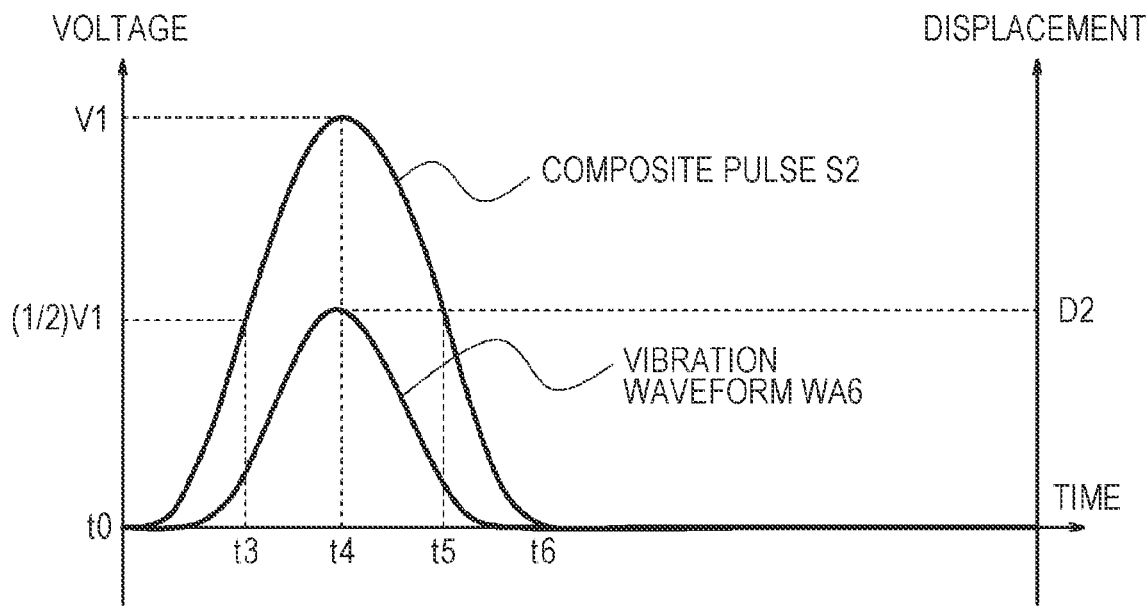
FIG. 9 is a diagram illustrating another example of the composite pulse according to the embodiment of the present disclosure.

FIG. 9 is a diagram illustrating another example of the composite pulse according to the embodiment of the present disclosure. A horizontal axis, a left vertical axis, and a right vertical axis in FIG. 9 are the same as those in FIG. 5.

The control unit 15 begins to input the composite pulse S2 to the vibration unit 13 at the time t0. The control unit 15 stops inputting the composite pulse S2 to the vibration unit 13 at a time t6. When the control unit 15 inputs the composite pulse S2 to the vibration unit 13, the displacement of the operation surface changes as indicated by a vibration waveform WA6. A maximum value of the vibration waveform WA6 is D2. D2 is a positive value.

The composite pulse S2 has a sinusoidal shape. Height of the composite pulse S2 is V1. Voltage of the composite pulse S2 becomes V1 at a time t4. A rising edge of the composite pulse S2 comes at a time t3. A falling edge of the composite pulse S2 comes at a time t5. Pulse width of the composite pulse S2 is a period of time from the time t3 to the time t5.

The composite pulse S2 is a combination of the first voltage pulse and the second voltage pulse. Pulse width of the first voltage pulse, which is one of the pulses included in the composite pulse S2, is, as described above, a period of time from the input of the first voltage pulse to the vibration unit 13 until the displacement of the operation surface reaches its maximum value. The second voltage pulse, which is the other of the pulses included in the composite pulse S2, offsets the vibration of the operation surface caused by the first voltage pulse. By inputting the composite pulse S2 to the vibration unit 13, strong vibration stimulation can be given to the user while shortening the period of time for which the vibration stimulation is given to the user compared to, for example, when a pulse other than the composite pulse S2 is input to the vibration unit 13. This effect can also be described with reference to FIG. 10.

Figure 10:
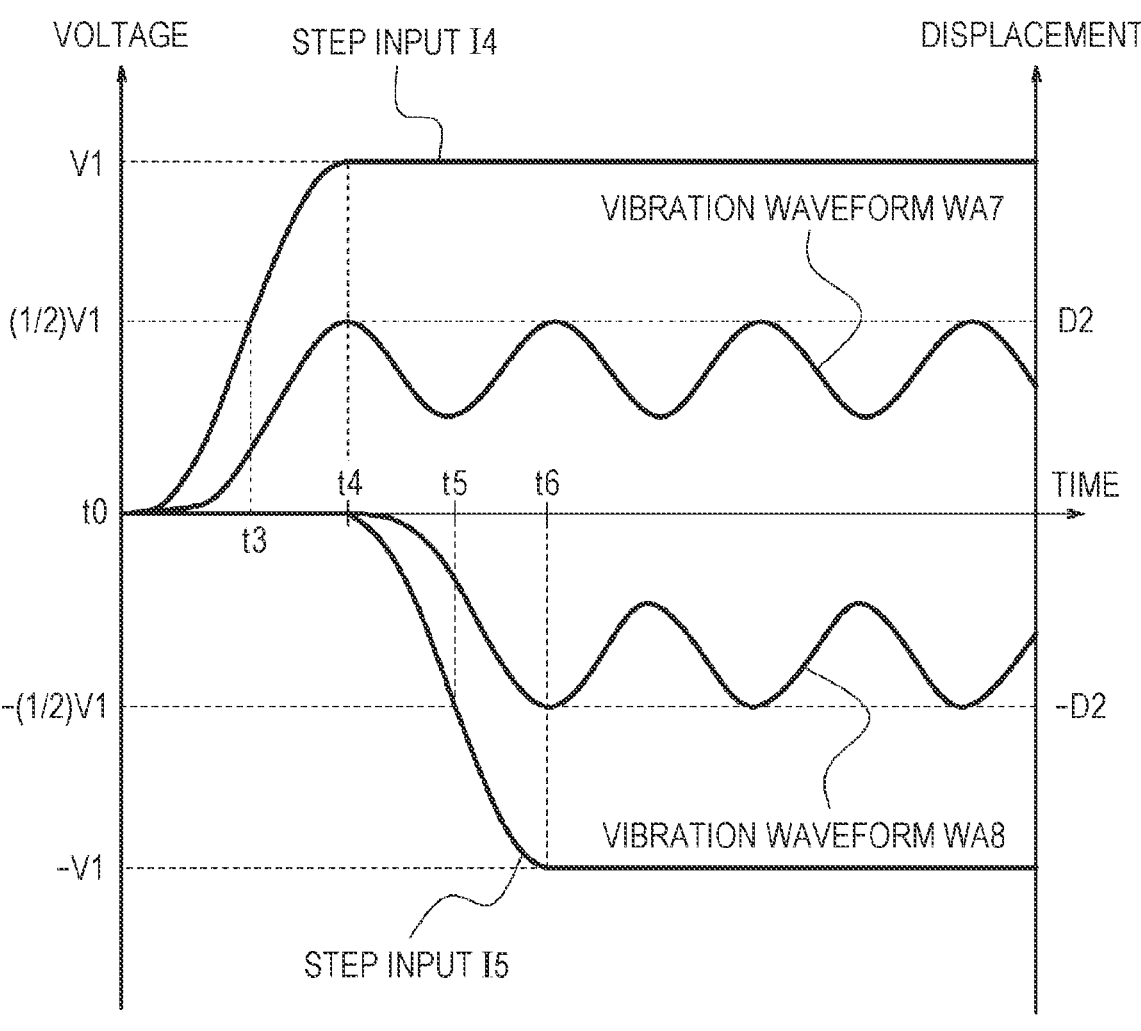
FIG. 10 is a diagram obtained by decomposing the composite pulse illustrated in FIG. 9.

FIG. 10 is a diagram obtained by decomposing the composite pulse S2 illustrated in FIG. 9. The composite pulse S2 illustrated in FIG. 9 can be decomposed into a step input I4 and a step input I5. A horizontal axis, a left vertical axis, and a right vertical axis in FIG. 10 are the same as those in FIG. 5.

The step input I4 begins to rise at the time t0. The step input I4 reaches half V1 at the time t3. The step input I4 rises to V1 at the time t4. The rise of the step input I4 corresponds to the rise of the composite pulse S2 illustrated in FIG. 9. When the step input I4 is input to the vibration unit 13, the displacement of the operation surface changes as indicated by a vibration waveform WA7. A phase of the vibration waveform WA7 is determined on the basis of the rise of the step input I4.

The step input I5 begins to fall at the time t4. The step input I5 reaches half −V1 at the time t5. The step input I5 falls to −V1 at the time t6. The fall of the step input I5 corresponds to the fall of the composite pulse S2 illustrated in FIG. 9. When the step input I5 is input to the vibration unit 13, the displacement of the operation surface changes as indicated by a vibration waveform WA8. A phase of the vibration waveform WA8 is determined on the basis of the fall of the step input I5.

The vibration waveform WA6 illustrated in FIG. 9 is a combination of the vibration waveform WA7, whose phase is determined on the basis of the step input I4, and the vibration waveform WA8, whose phase is determined on the basis of the step input I5.

Here, after the time t6, the vibration waveform WA7 and the vibration waveform WA8 cancel each other. For example, a time at which the vibration waveform WA7 reaches the maximum value D2 and a time at which the vibration waveform WA8 reaches the minimum value −D2 are the same. With this configuration, amplitude of the vibration waveform WA6, which is the combination of the vibration waveform WA7 and the vibration waveform WA8, converges to zero after the time t6.

By inputting the composite pulse S2 to the vibration unit 13, too, strong vibration stimulation can be given to the user while shortening the period of time for which the vibration stimulation is given to the user as described above.

In yet another example of the composite pulse, the control unit 15 may input a composite pulse having a shape illustrated in FIG. 11, 12, 13, or 14 to the vibration unit 13. Horizontal axes, left vertical axes, and right vertical axes in FIGS. 11 to 14 are the same as those in FIG. 5.

Figure 11:
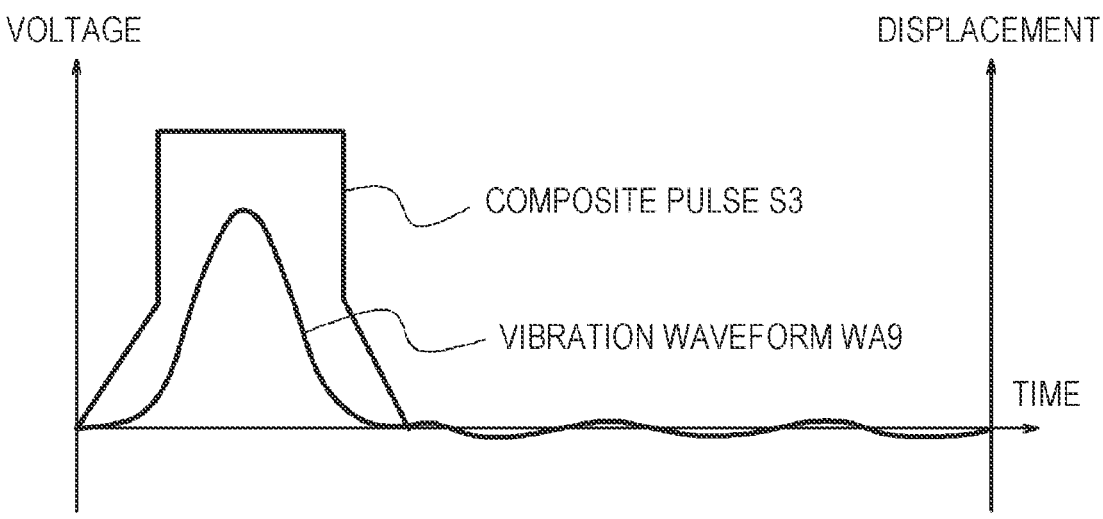
FIG. 11 is a diagram illustrating yet another example of the composite pulse according to the embodiment of the present disclosure.

A composite pulse S3 illustrated in FIG. 11 has a shape of a rectangle on a trapezoid. When the control unit 15 inputs the composite pulse S3 to the vibration unit 13, the displacement of the operation surface changes as indicated by a vibration waveform WA9.

Figure 12:
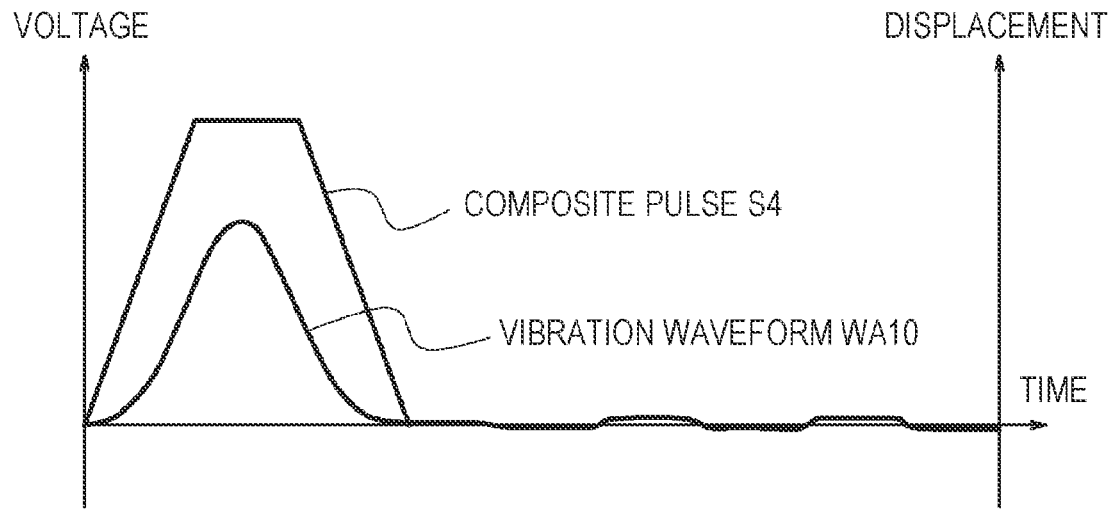
FIG. 12 is a diagram illustrating yet another example of the composite pulse according to the embodiment of the present disclosure.

A composite pulse S4 illustrated in FIG. 12 has a trapezoidal shape. When the control unit 15 inputs the composite pulse S4 to the vibration unit 13, the displacement of the operation surface changes as indicated by a vibration waveform WA10.

Figure 13:
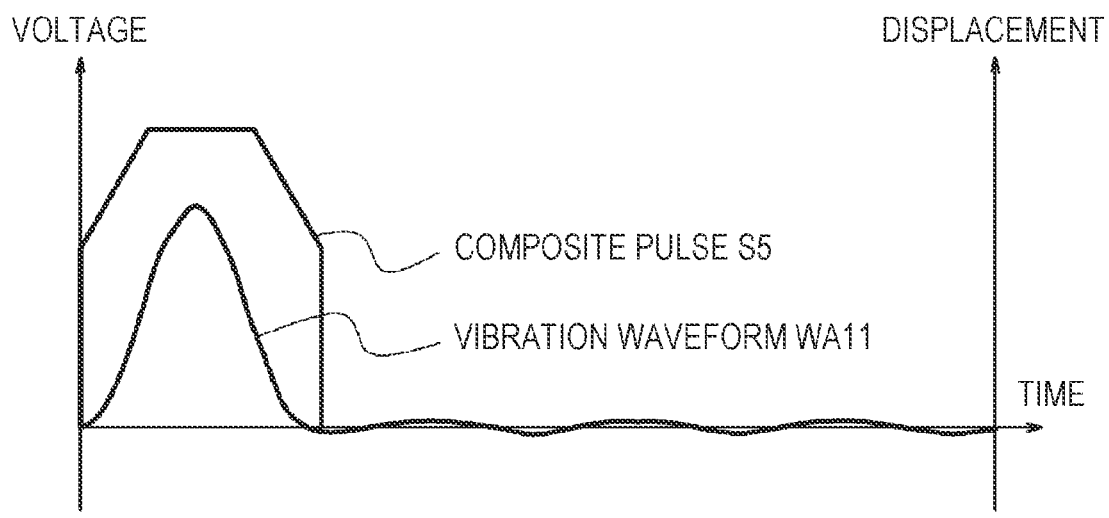
FIG. 13 is a diagram illustrating yet another example of the composite pulse according to the embodiment of the present disclosure.

A composite pulse S5 illustrated in FIG. 13 has a shape of a trapezoid on a rectangle. When the control unit 15 inputs the composite pulse S5 to the vibration unit 13, the displacement of the operation surface changes as indicated by a vibration waveform WA11.

Figure 14:
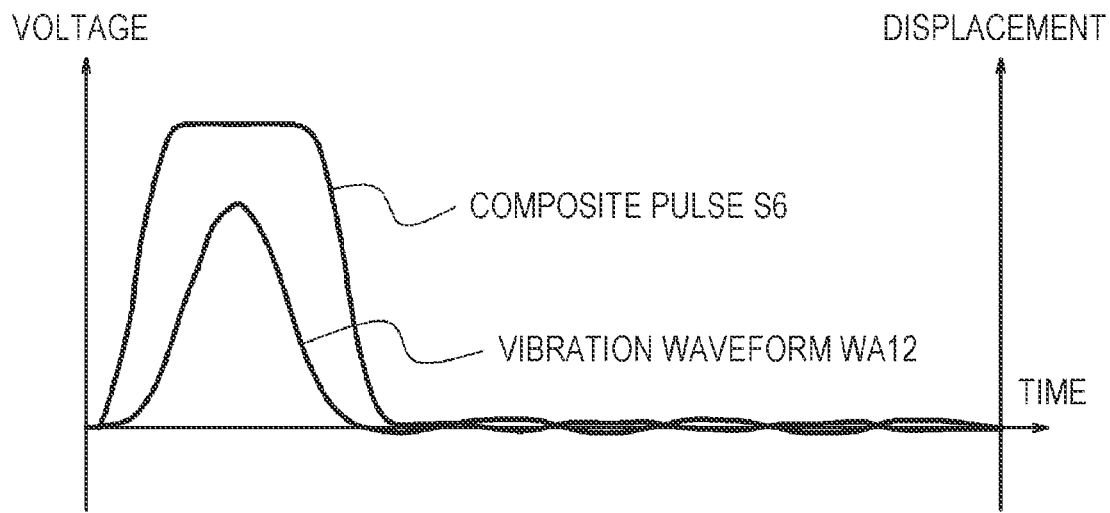
FIG. 14 is a diagram illustrating yet another example of the composite pulse according to the embodiment of the present disclosure.

A composite pulse S6 illustrated in FIG. 14 has a pseudo-rectangular shape. In other words, the composite pulse S6 has a slightly collapsed rectangular shape. When the control unit 15 inputs the composite pulse S6 to the vibration unit 13, the displacement of the operation surface changes as indicated by a vibration waveform WA12.

A composite pulse may be employed when vibration attenuates in a vibration system including an operation surface. This example will be described with reference to FIGS. 15 and 16.

Figure 15:
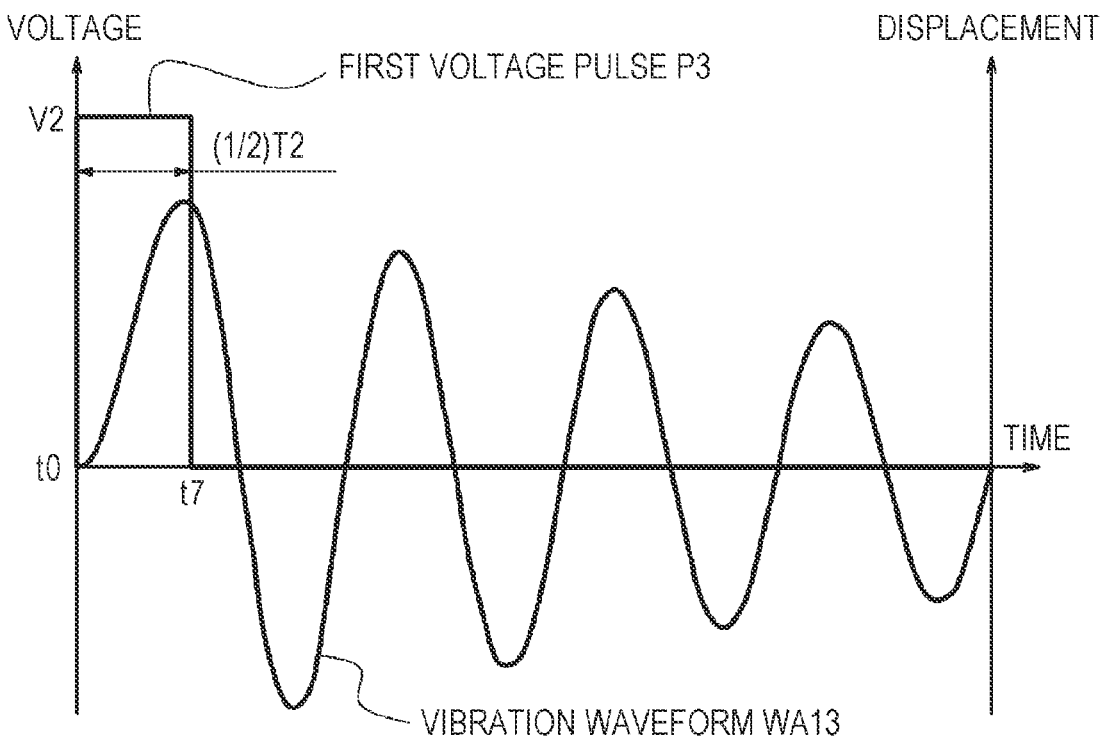
FIG. 15 is a diagram illustrating a first voltage pulse in a configuration where vibration attenuates.

FIG. 15 is a diagram illustrating a first voltage pulse P3 in a configuration where vibration attenuates. A horizontal axis, a left vertical axis, and a right vertical axis in FIG. 15 are the same as those in FIG. 5. A natural period of a vibration system including an operation surface in a configuration where vibration attenuates will also be referred to as a "natural period T2".

Pulse width of the first voltage pulse P3 is a period of time half as long as the natural period T2. Height of the first voltage pulse P3 is V2. V2 is a positive voltage. The first voltage pulse P3 has a rectangular shape.

The control unit 15 begins to input the first voltage pulse P3 to the vibration unit 13 at the time t0. The control unit 15 stops inputting the first voltage pulse P3 to the vibration unit 13 at a time t7. The time t7 is a point in time when half the natural period T2 has elapsed since the time t0.

When the control unit 15 inputs the first voltage pulse P3 to the vibration unit 13, the displacement of the operation surface changes as indicated by vibration waveform WA13. In the configuration illustrated in FIG. 15 where vibration attenuates, amplitude of the vibration waveform WA13 attenuates over time.

Figure 16:
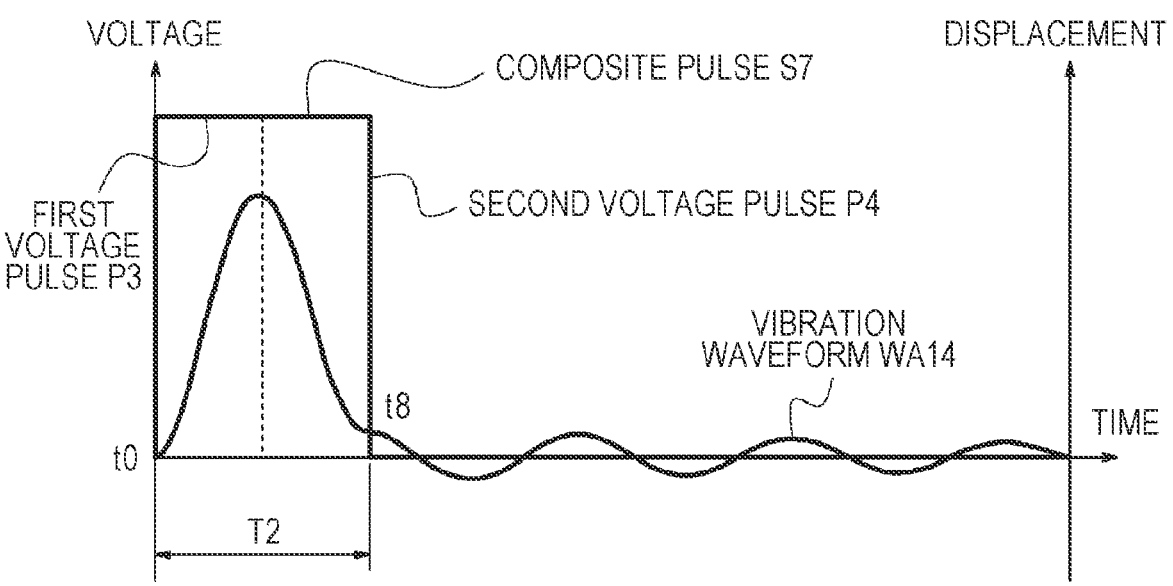
FIG. 16 is a diagram illustrating an example of a composite pulse employed for the configuration illustrated in FIG. 15.

FIG. 16 is a diagram illustrating an example of a composite pulse employed for the configuration illustrated in FIG. 15. A horizontal axis, a left vertical axis, and a right vertical axis in FIG. 16 are the same as those in FIG. 5.

A composite pulse S7 is a combination of the first voltage pulse P3 and a second voltage pulse P4. The composite pulse S7 is configured as a single pulse. The second voltage pulse P4 has the same pulse width as that of the first voltage pulse P3. The second voltage pulse P4 has the same height as that of the first voltage pulse P3. Polarity of the second voltage pulse P4 is the same as that of the first voltage pulse P3.

Pulse width of the composite pulse S7 is a period of time equal to the natural period T2. The composite pulse S7 has a rectangular shape. The composite pulse S7, however, may have one of the shapes illustrated in FIGS. 9, 11, 12, 13, and 14.

The control unit 15 begins to input the composite pulse S7 to the vibration unit 13 at the time t0. The control unit 15 stops inputting the composite pulse S7 to the vibration unit 13 at a time t8. The time t8 is a point in time when a period of time equal to the natural period T2 has elapsed since the time t0.

When the control unit 15 inputs the composite pulse S7 to the vibration unit 13, the displacement of the operation surface changes as indicated by a vibration waveform WA14. After the time t8, amplitude of the vibration waveform WA14 gradually converges to zero. Even when the amplitude of the vibration waveform WA14 gradually converges to zero, the amplitude of the vibration waveform WA14 after the time t8 is significantly small compared to a maximum value of the vibration waveform WA14 from the time t0 to the time t8. Since the amplitude of the vibration waveform WA14 after the time t8 is significantly small, it becomes unlikely for the user to feel vibration stimulation based on the vibration waveform WA14 after the time t8. With the configuration illustrated in FIG. 16, therefore, a tactile sensation can be presented to the user.

As will be described with reference to FIG. 17, the control unit 15 may input, to the vibration unit 13, a composite pulse obtained by superimposing a part of the first voltage pulse and a part of the second voltage pulse upon each other.

Figure 17:
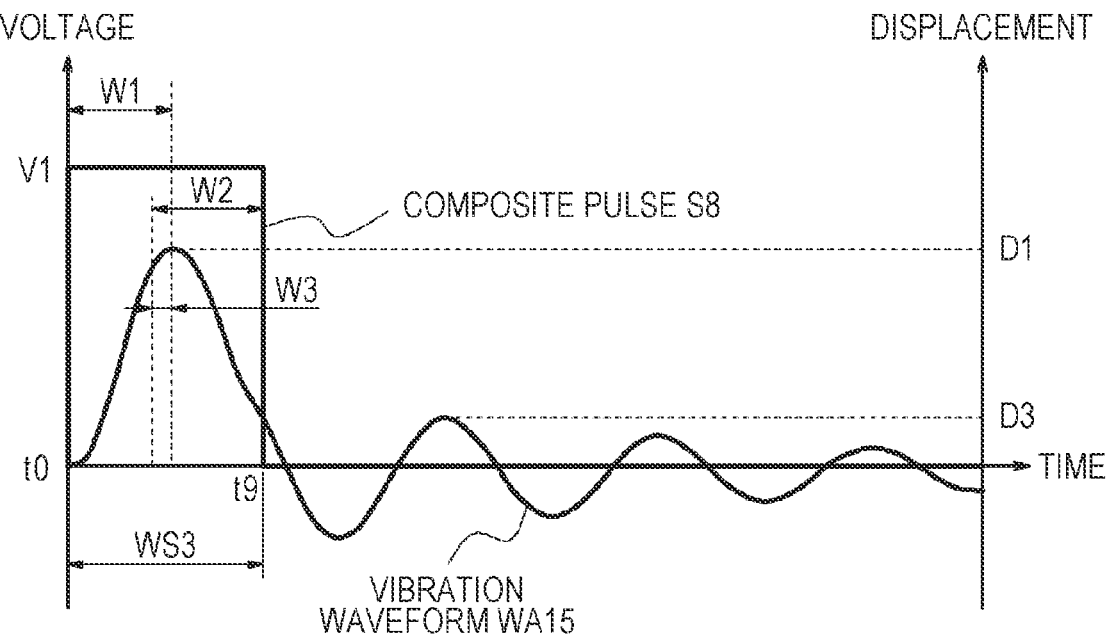
FIG. 17 is a diagram illustrating yet another example of the composite pulse according to the embodiment of the present disclosure.

FIG. 17 is a diagram illustrating yet another example of the composite pulse according to the embodiment of the present disclosure. A horizontal axis, a left vertical axis, and a right vertical axis in FIG. 17 are the same as those in FIG. 5.

A composite pulse S8 is obtained by superimposing a part of the first voltage pulse P1 and a part of the second voltage pulse P2 illustrated in FIG. 7 upon each other. In the composite pulse S8, the first voltage pulse P1 and the second voltage pulse P2 are superimposed upon each other such that the pulse width W1 of the first voltage pulse P1 and the pulse width W2 of the second voltage pulse P2 overlap by an overlap width W3.

The composite pulse S8 has a pulse width WS3. The pulse width WS3 is smaller than a period of time equal to the natural period T2, since a part of the first voltage pulse P1 and a part of the second voltage pulse P2 are superimposed upon each other. The composite pulse S8 has the height V1. The composite pulse S8 has a rectangular shape. The composite pulse S8, however, may have one of the shapes illustrated in FIGS. 9, 11, 12, 13, and 14.

The control unit 15 begins to input the composite pulse S8 to the vibration unit 13 at the time t0. The control unit 15 stops inputting the composite pulse S8 to the vibration unit 13 at a time t9. The time t9 is a point in time when a period of time corresponding to the pulse width WS3 has elapsed since the time t0.

When the control unit 15 inputs the composite pulse S8 to the vibration unit 13, the displacement of the operation surface changes as indicated by a vibration waveform WA15. A maximum value of a first wave of the vibration waveform WA15 is D1. A maximum value of a second wave of the vibration waveform WA15 is D3. D3 is a positive value.

The overlap width W3 may be appropriately set such that D3 of the second wave of the vibration waveform WA15 achieves a preset ratio with respect to the maximum value D1 of the first wave. As the overlap width W3 decreases, the ratio of D3 to D1 becomes lower. As the overlap width W3 increases, the ratio of D3 to D1 becomes higher. The ratio of D3 to D1 is set in advance, for example, in a specification document of the tactile sensation presentation apparatus 1 or the like. When the ratio of D3 to D1 is 30%, for example, the overlap width W3 is set to 8% of the pulse width W1.

When the composite pulse S8 is input to the vibration unit 13, amplitude of the vibration waveform WA15 gradually converges to zero after the time t9. Even when the amplitude of the vibration waveform WA15 gradually converges zero, the amplitude of the vibration waveform WA15 after the time t9 is significantly small compared to the maximum value D1. Since the amplitude of the vibration waveform WA15 after the time t9 is significantly small, a tactile sensation can be presented to the user with the configuration illustrated in FIG. 17.

Here, if the second voltage pulse is input to the vibration unit 13 in such a way as to offset the vibration of the operation surface caused by the first voltage pulse, the first voltage pulse and the second voltage pulse need not be combined together. This example will be described hereinafter with reference to FIGS. 18 to 20.

Figure 18:
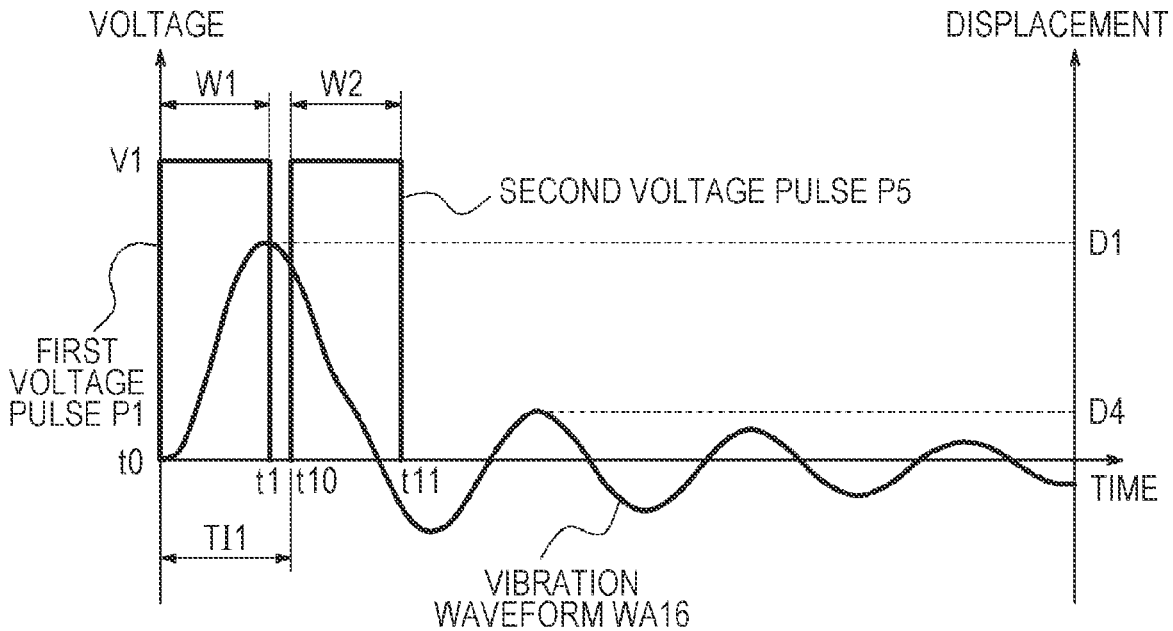
FIG. 18 is a diagram illustrating a first voltage pulse and a second voltage pulse according to another embodiment of the present disclosure.

FIG. 18 is a diagram illustrating a first voltage pulse and a second voltage pulse according to another embodiment of the present disclosure. A horizontal axis, a left vertical axis, and a right vertical axis in FIG. 18 are the same as those in FIG. 5.

A second voltage pulse P5 has the pulse width W2 as with the second voltage pulse P2 illustrated in FIG. 7. Polarity of the second voltage pulse P5 is the same as that of the first voltage pulse P1. The second voltage pulse P5 has the height V1 as with the first voltage pulse P1. The second voltage pulse P5 has a rectangular shape. The shape of the second voltage pulse P5 may be the same as that of the first voltage pulse P1.

As described with reference to FIG. 5, the control unit 15 inputs the first voltage pulse P1 to the vibration unit 13. After stopping inputting the first voltage pulse P1 to the vibration unit 13, the control unit 15 begins to input the second voltage pulse P5 to the vibration unit 13 at a time t10. The control unit 15 stops inputting the second voltage pulse P5 to the vibration unit 13 at a time t11.

When the control unit 15 inputs the first voltage pulse P1 and the second voltage pulse P5 to the vibration unit 13, the displacement of the operation surface changes as indicated by a vibration waveform WA16. A maximum value of a first wave of the vibration waveform WA16 is D1. A maximum value of a second wave of the vibration waveform WA16 is D4. D4 is a positive value.

The control unit 15 performs control such that a time TI1 becomes longer than or equal to half the natural period T2. The time TI1 is a period of time from the time t0, at which the input of the first voltage pulse P1 to the vibration unit 13 starts, to the time t10, at which the input of the second voltage pulse P5 to the vibration unit 13 starts.

The vibration waveform WA16 decreases after the time t1 until a period of time equal to the natural period T2 has elapsed since the time t0. Since the time TI1 is longer than or equal to half the natural period T2, the second voltage pulse P5 is input to the vibration unit 13 when the vibration waveform WA16 decreases. The second voltage pulse P5 acts to attenuate the displacement of the operation surface. That is, the second voltage pulse P5 offsets the vibration of the operation surface caused by the first voltage pulse P1. With this configuration, amplitude of the vibration waveform WA16 gradually converges to zero after the time t11. Even when the amplitude of the vibration waveform WA16 gradually converges to zero, the amplitude of the vibration waveform WA16 after the time t11 is significantly small compared to the maximum value D1. Since the amplitude of the vibration waveform WA16 after the time t11 is significantly small, a tactile sensation can be presented to the user with the configuration illustrated in FIG. 18.

The time TI1, which is longer than or equal to half the natural period T2, may be appropriately set such that the maximum value D4 of a second wave of the vibration waveform WA16 achieves a preset ratio with respect to the maximum value D1 of a first wave of the vibration waveform WA16. As the time TI1 decreases, the ratio of D4 to D1 becomes lower. As the time TI1 increases, the ratio of D4 to D1 becomes higher. The ratio of D4 to D1 is set in advance, for example, in the specification document of the tactile sensation presentation apparatus 1 or the like. When the ratio of D4 to D1 is 30%, for example, the time TI1 is set to 108% of the pulse width W1.

As will be described with reference to FIG. 19, the control unit 15 may input the second voltage pulse to the vibration unit 13 such that the first voltage pulse and the second voltage pulse become symmetrical to each other with a time at which the displacement of the operation surface changes from the maximum value to the minimum value or from the minimum value to the maximum value as an axis of symmetry.

Figure 19:
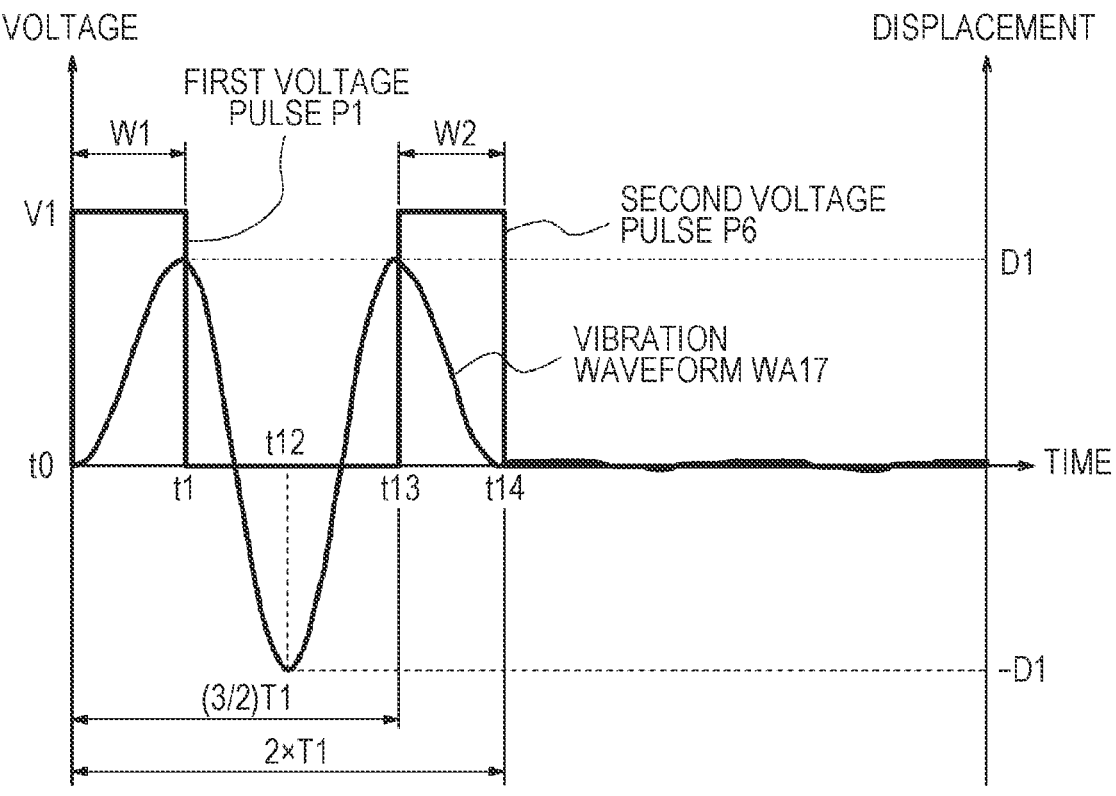
FIG. 19 is a diagram illustrating a first voltage pulse and a second voltage pulse according to yet another embodiment of the present disclosure.

FIG. 19 is a diagram illustrating a first voltage pulse and a second voltage pulse according to yet another embodiment of the present disclosure. A horizontal axis, a left vertical axis, and a right vertical axis in FIG. 19 are the same as those in FIG. 5.

A second voltage pulse P6 has the pulse width W2 as with the second voltage pulse P2 illustrated in FIG. 7. Polarity of the second voltage pulse P6 is the same as that of the first voltage pulse P1. The second voltage pulse P6 has the height V1 as with the first voltage pulse P1. The second voltage pulse P6 has a rectangular shape. The shape of the second voltage pulse P6 may be the same as that of the first voltage pulse P1.

As described above with reference to FIG. 5, the control unit 15 inputs the first voltage pulse P1 to the vibration unit 13. After stopping inputting the first voltage pulse P1 to the vibration unit 13, the control unit 15 begins to input the second voltage pulse P6 to the vibration unit 13 at a time t13. The control unit 15 stops inputting the second voltage pulse P5 to the vibration unit 13 at a time t14.

When the control unit 15 inputs the first voltage pulse P1 and the second voltage pulse P6 to the vibration unit 13, the displacement of the operation surface changes as indicated by a vibration waveform WA17. The vibration waveform WA17 reaches the maximum value D1 at the time t1. The vibration waveform WA17 reaches the minimum value –D1 at the time t9.

The control unit 15 inputs the second voltage pulse P6 to the vibration unit 13 such that the first voltage pulse P1 and the second voltage pulse P2 become linearly symmetrical to each other with a time t12 as an axis of symmetry, for example, the graph illustrated in FIG. 19 including the axis representing time and the axis representing voltage input to the vibration unit 13. The time t12 is a time at which the displacement of the operation surface changes from the maximum value to the minimum value as indicated by the vibration waveform WA17. Since the first voltage pulse P1 and the second voltage pulse P2 are symmetrical to each other with the time t12 as the axis of symmetry, a period of time from the time t1 to the time t12 and a period of time from the time t12 to the time t13 can become the same.

Since the first voltage pulse P1 and the second voltage pulse P2 become linearly symmetrical to each other with the time t12 as the axis of symmetry, a maximum value of the vibration waveform WA17 becomes D1, and a minimum value of the vibration waveform WA17 becomes –D1. With this configuration, amplitude of the vibration waveform WA17 is 2×D1 [=D1–(–D1)], that is, twice as large as that of the vibration waveform WA2 and the vibration waveform WA3 illustrated in FIG. 6, namely D1.

Since the first voltage pulse P1 and the second voltage pulse P2 become linearly symmetrically to each other with the vibration time t12 as the axis of symmetry, the input of the second voltage pulse P6 to the vibration unit 13 starts at the time t13. The vibration waveform WA17 decreases for a certain period of time from the time t13. The second voltage pulse P6 acts to attenuate the displacement of the operation surface. That is, from the time t13 to the time t14, the second voltage pulse P6 acts to attenuate the displacement of the operation surface and offsets the vibration of the operation surface caused by the first voltage pulse P1. With this configuration, the vibration waveform WA17 converges to zero after the time t14.

The vibration waveform WA17, which has the amplitude 2×D1, thus converges to zero after the time t14. Since the control unit 15 inputs the first voltage pulse P1 and the second voltage pulse P6 to the vibration unit 13, therefore, vibration stimulation given to the user can be increased, and a period of time for which the vibration stimulation is given to the user can be reduced to about twice as long as the natural period T1.

Here, the time t13 is a point in time when ½ of the natural period T1 has elapsed since the time t0, at which the input of the first voltage pulse P1 to the vibration unit 13 starts. After the time t13, the control unit 15 may input the second voltage pulse P6 to the vibration unit 13. With this configuration, too, vibration stimulation given to the user can be increased, and a period of time for which the vibration stimulation is given to the user can be shortened.

With the configuration illustrated in FIG. 19, the first voltage pulse P1, whose height is a positive voltage, is input to the vibration unit 13. The control unit 15, however, may input a first voltage pulse whose height is a negative voltage to the vibration unit 13. When the first voltage pulse whose height is a negative voltage is input to the vibration unit 13, the operation surface vibrates such that polarity of the displacement of the operation surface becomes opposite that of the displacement of the vibration waveform WA17. In this case, the control unit 15 inputs the second voltage pulse to the vibration unit 13 such that the first voltage pulse and the second voltage pulse become linearly symmetrical to each other with a time at which the displacement of the operation surface changes from a minimum value to a maximum value as an axis of symmetry. When the first voltage pulse whose height is a negative voltage is input to the vibration unit 13, polarity of the second voltage pulse may be negative as with that of the first voltage pulse.

As will be described with reference to FIG. 20, the control unit 15 may input the second voltage pulse to the vibration unit 13 such that the first voltage pulse and the second voltage pulse become point-symmetric to each other with a time at which the displacement of the operation surface becomes zero as a point of symmetry, instead.

Figure 20:
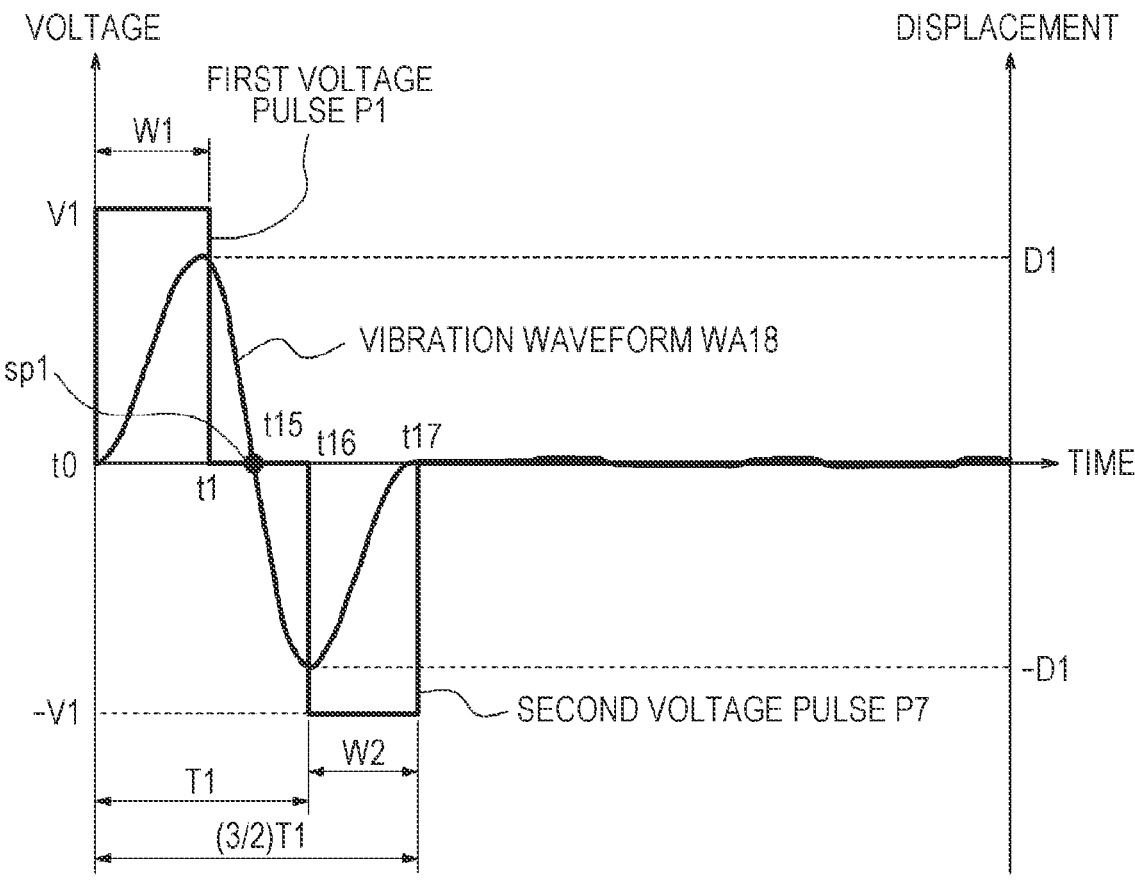
FIG. 20 is a diagram illustrating a first voltage pulse and a second voltage pulse according to yet another embodiment of the present disclosure.

FIG. 20 is a diagram illustrating a first voltage pulse and a second voltage pulse according to yet another embodiment of the present disclosure. A horizontal axis, a left vertical axis, and a right vertical axis in FIG. 20 are the same as those in FIG. 5.

A second voltage pulse P7 has a pulse width W2 as with the second voltage pulse P2 illustrated in FIG. 7. Polarity of the second voltage pulse P7 is opposite that of the first voltage pulse P1. The second voltage pulse P7 has the height –V1. The second voltage pulse P7 has a rectangular shape.

As described above with reference to FIG. 5, the control unit 15 inputs the first voltage pulse P1 to the vibration unit 13. After stopping inputting the first voltage pulse P1 to the vibration unit 13, the control unit 15 begins to input the second voltage pulse P7 to the vibration unit 13 at a time t16. The control unit 15 stops inputting the second voltage pulse P7 to the vibration unit 13 at a time t17.

When the control unit 15 inputs the first voltage pulse P1 and the second voltage pulse P7 to the vibration unit 13, the displacement of the operation surface changes as indicated by a vibration waveform WA18. The vibration waveform WA18 reaches the maximum value D1 at the time t1. The vibration waveform WA18 becomes zero at a time t15. The vibration waveform WA18 reaches the minimum value –D1 at the time t16.

The control unit 15 inputs the second voltage pulse P6 to the vibration unit 13 such that the first voltage pulse P1 and the second voltage pulse P2 become point-symmetric to each other with a point sp1 as a point of symmetry in, for example, the graph illustrated in FIG. 20 including the axis representing time and the axis representing voltage input to the vibration unit 13. The point sp1 is a point in the graph including the axis representing time and the axis representing voltage input to the vibration unit 13. The point sp1 indicates a time at which the displacement of the operation surface becomes zero. The voltage input to the vibration unit 13 at the point sp1 is zero. Since the first voltage pulse P1 and the second voltage pulse P2 become point-symmetric to each other with the point sp1 as the point of symmetry, a period of time from the time t1 to the time t15 and a period of time from the time t15 to the time t16 can be the same. The polarity of the first voltage pulse P1 and the polarity of the second voltage pulse P7 become opposite.

Since the first voltage pulse P1 and the second voltage pulse P2 become point-symmetric to each other with the point sp1 as the point of symmetry, the maximum value of the vibration waveform WA18 becomes D1, and the minimum value of the vibration waveform WA18 becomes –D1. With this configuration, amplitude of the vibration waveform WA18 becomes 2×D1[=D1–(–D1)], that is, twice as large as that of the vibration waveform WA2 and the vibration waveform WA3 illustrated in FIG. 6, namely D1.

Since the first voltage pulse P1 and the second voltage pulse P2 become point-symmetric to each other with the point sp1 as the point of symmetry, the input of the second voltage pulse P7 to the vibration unit 13 starts at the time t16. The vibration waveform WA18 increases for a certain period of time from the time t16. The second voltage pulse P7 acts to decrease the displacement of the operation surface. That is, the second voltage pulse P7 acts to decrease the displacement of the operation surface from the time t16 to the time t17 and offsets the vibration of the operation surface caused by the first voltage pulse P1. With this configuration, the vibration waveform WA18 converges to zero after the time t17.

The vibration waveform WA18, which has the amplitude 2×D1, thus converges to zero after the time t17. When the control unit 15 inputs the first voltage pulse P1 and the second voltage pulse P7 to the vibration unit 13, therefore, vibration stimulation given to the user can be increased, and a period of time for which the vibration stimulation is given to the user can be shortened to about ½ of the natural period T1.

Here, the time t16 is a point in time when a period of time equal to the natural period T1 has elapsed since the time t0, at which the input of the first voltage pulse P1 to the vibration unit 13 starts. The control unit 15 may input the second voltage pulse P7 to the vibration unit 13 when the time t16 has elapsed. With this configuration, too, vibration stimulation given to the user can be increased, and a period of time for which the vibration stimulation is given to the user can be shortened.

Figure 21:
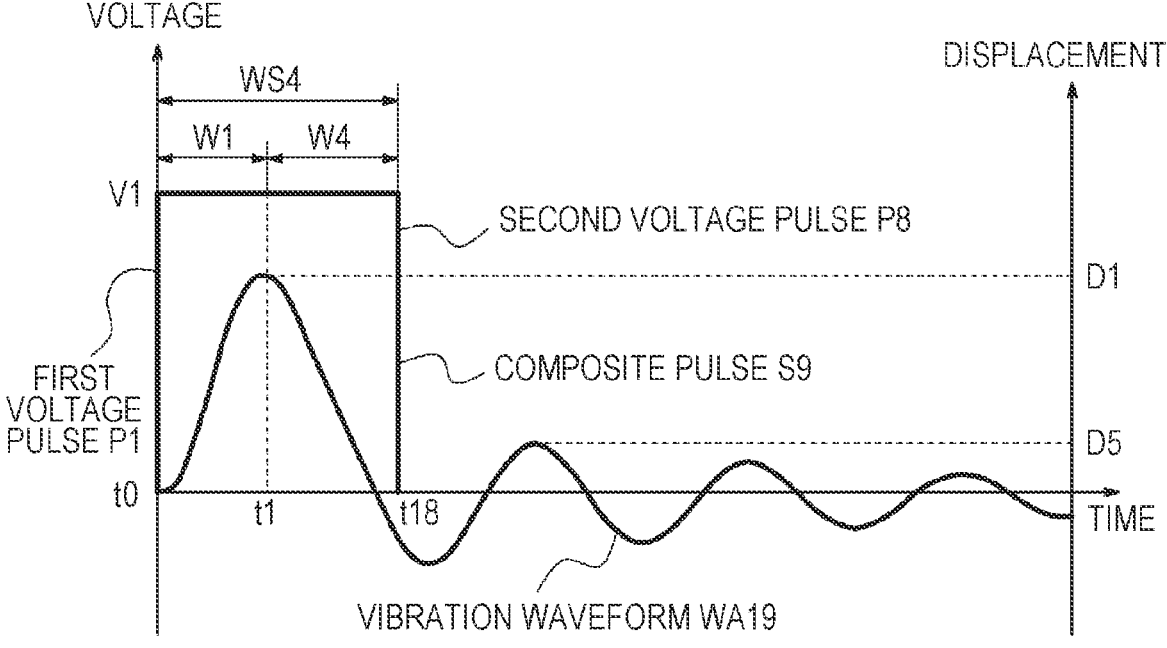
FIG. 21 is a diagram illustrating yet another example of the composite pulse according to the embodiment of the present disclosure.

As illustrated in FIG. 21, the control unit 15 may input a composite pulse S9 to the vibration unit 13, instead of inputting the first voltage pulse P1 and the second voltage pulse P5, which are separate from each other, illustrated in FIG. 18 to the vibration unit 13.

FIG. 21 is a diagram illustrating yet another example of the composite pulse according to the embodiment of the present disclosure. A horizontal axis, a left vertical axis, and a right vertical axis in FIG. 21 are the same as those in FIG. 5.

A composite pulse S9 is a combination of the first voltage pulse P1 and a second voltage pulse P8. The composite pulse S9 has a pulse width WS4. The pulse width WS4 is a combination of the pulse width W1 of the first voltage pulse P1 and a pulse width W4 of the second voltage pulse P8. The composite pulse S9 has the height V1. The composite pulse S9 has a rectangular shape. The composite pulse S9, however, may have one of the shapes illustrated in FIGS. 9, 11, 12, 13, and 14.

The control unit 15 begins to input the composite pulse S9 to the vibration unit 13 at the time t0. The control unit 15 stops inputting the composite pulse S9 to the vibration unit 13 at a time t18. The time t18 is a point in time when a period of time corresponding to the pulse width WS4 has elapsed since the time t0.

When the control unit 15 inputs the composite pulse S9 to the vibration unit 13, the displacement of the operation surface changes as indicated by a vibration waveform WA19. A maximum value of a first wave surface of the vibration waveform WA19 is D1. A maximum value of a second wave of the vibration waveform WA19 is D5. D5 is a positive value.

The pulse width WS4 may be appropriately set such the maximum value D5 of the second wave of the vibration waveform WA19 achieves a preset ratio with respect to the maximum value D1 of the first wave. As with, or similarly to, D4 with respect to D1, the ratio of D5 to D1 is set in advance, for example, in the specification document of the tactile sensation presentation apparatus 1 or the like. When the ratio of D5 to D1 is 30%, for example, the pulse width WS4 is set to 108% of the natural period T2.

When the composite pulse S9 is input to the vibration unit 13, amplitude of the vibration waveform WA19 gradually converges to zero after the time t18. Even when the amplitude of the vibration waveform WA19 gradually converges to zero, the amplitude of the vibration waveform WA19 after the time t18 is significantly small compared to the maximum value D1. Since the amplitude of the vibration waveform WA19 after the time t18 is significantly small, a tactile sensation can be presented to the user with the configuration illustrated in FIG. 20.

Figure 22:
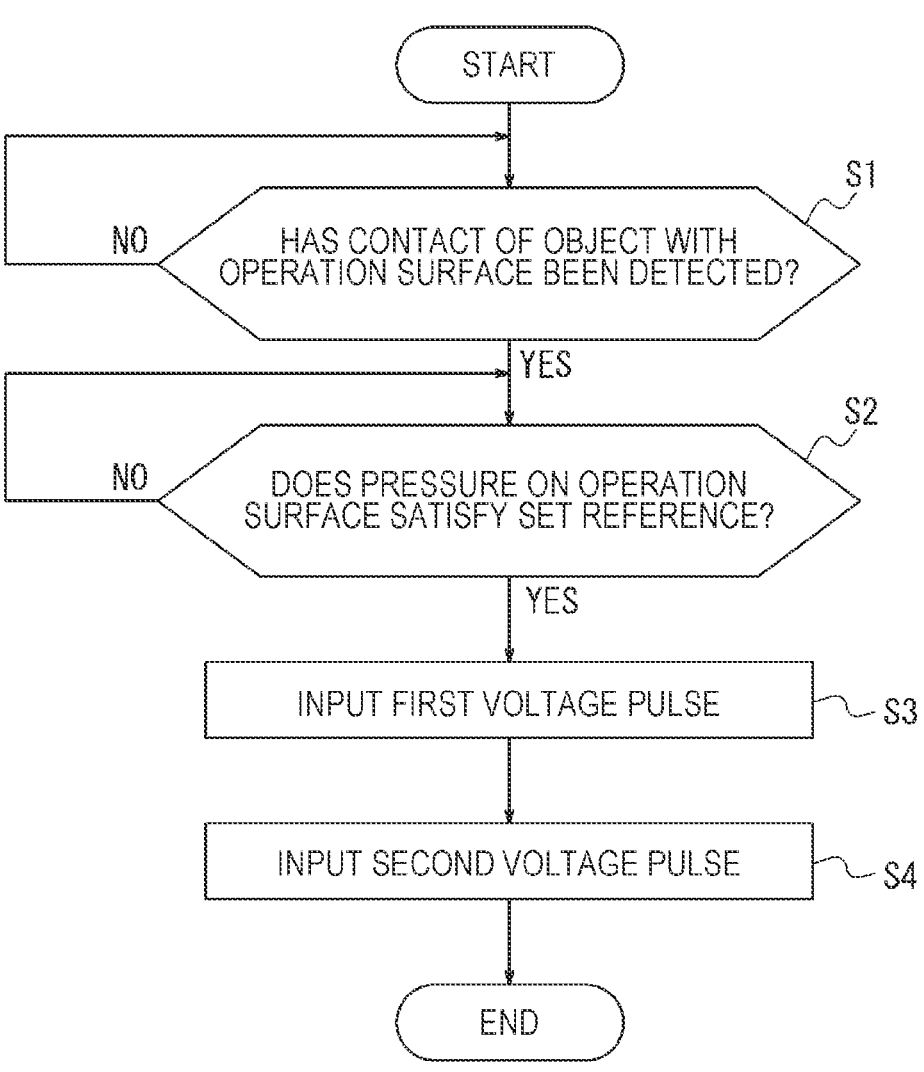
FIG. 22 is a flowchart illustrating a procedure of a process for presenting a tactile sensation performed by the tactile sensation presentation apparatus illustrated in FIG. 1.

FIG. 22 is a flowchart illustrating a procedure of a process for presenting a tactile sensation performed by the tactile sensation presentation apparatus 1 illustrated in FIG. 1. The process corresponds to an example of a method for controlling vibration according to the present embodiment. The control unit 15 may start processing in step S1 at any time. For example, the control unit 15 starts the processing in step S1 when the tactile sensation presentation apparatus 1 is turned on.

The control unit 15 determines whether the contact detection unit 11 has detected contact of an object with the operation surface (step S1). If the control unit 15 determines that contact of an object with the operation surface has been detected (step S1: YES), the control unit 15 proceeds to processing in step S2. If the control unit 15 does not determine that contact of an object with the operation surface has been detected (step S1: NO), on the other hand, the control unit 15 performs the processing in step S1 again.

In the processing in step S2, the control unit 15 determines whether pressure on the operation surface detected by the pressure detection unit 12 satisfies the set criterion. If determining that the pressure on the operation surface satisfies the set criterion (step S2: YES), the control unit 15 proceeds to processing in step S3. If not determining that the pressure on the operation surface satisfies the set criterion (step S2: NO), on the other hand, the control unit 15 performs the processing in step S2 again.

In the processing in step S3, the control unit 15 inputs the first voltage pulse to the vibration unit 13. After inputting the first voltage pulse, the control unit 15 inputs the second voltage pulse to the vibration unit 13 in such a way as to offset vibration of the operation surface (step S4). After completing the processing in step S4, the control unit 15 ends the process for presenting a tactile sensation. After ending the process for presenting a tactile sensation, the control unit 15 may perform the processing in step S1 again at any time.

As described above, in the tactile sensation presentation apparatus 1, the control unit 15 inputs the first voltage pulse to the vibration unit 13. The pulse width of the first voltage pulse is a period of time from the input of the first voltage pulse to the vibration unit 13 until the displacement of the operation surface reaches its maximum value. By inputting the first voltage pulse to the vibration unit 13, stronger vibration stimulation can be given to the user than when, for example, a voltage pulse having a pulse width different from that of the first voltage pulse is input to the vibration unit 13. After inputting the first voltage pulse, the control unit 15 inputs the second voltage pulse to the vibration unit 13 in such a way as to offset vibration of the operation surface. By inputting the second voltage pulse to the vibration unit 13, a period of time for which the vibration stimulation is given to the user can be shortened compared to when, for example, the second voltage pulse is not input to the vibration unit 13. The tactile sensation presentation apparatus 1 can present a more realistic clicking feel to the user by giving strong vibration stimulation to the user while shortening a period of time for which the vibration stimulation is given to the user.

Here, as a method for shortening a period of time for which vibration stimulation is given to the user, a method is possible where a vibration attenuation member for attenuating vibration of a vibration target is provided for the tactile sensation presentation apparatus. If such a vibration attenuation member is provided for the tactile sensation presentation apparatus, however, the tactile sensation presentation apparatus might undesirably increase in size. Such a vibration attenuation member might also attenuate intended vibration of the vibration target. If the intended vibration is attenuated, it might become difficult to present a realistic clicking feel to the user. A vibration attenuation rate of the vibration attenuation member provided for the tactile sensation presentation apparatus, therefore, sometimes cannot be increased. If the vibration attenuation rate of the vibration attenuation member cannot be increased, a period of time for which vibration stimulation is given to the user might not be efficiently shortened.

With the tactile sensation presentation apparatus 1 according to the present embodiment, a period of time for which vibration stimulation is given to the user can be shortened by inputting the second voltage pulse to the vibration unit 13, even if the above-described vibration attenuation member is not provided. Since the vibration attenuation member need not be provided for the tactile sensation presentation apparatus 1, a possibility that the tactile sensation presentation apparatus 1 might increase in size can be reduced. By using the second voltage pulse, a period of time for which vibration stimulation is given to the user can be efficiently shortened than when the vibration attenuation member is used.

According to the present embodiment, therefore, the tactile sensation presentation apparatus 1 and the method for controlling vibration with improved control of vibration can be provided.

In the tactile sensation presentation apparatus 1 according to the present embodiment, the polarity of the second voltage pulse may be the same as that of the first voltage pulse. Since the polarity of the second voltage pulse is the same as that of the first voltage pulse, the second voltage pulse can be generated using a circuit or the like for generating the first voltage pulse. The tactile sensation presentation apparatus 1, therefore, need not include a dedicated circuit or the like for generating the second voltage pulse. With this configuration, a more realistic clicking feel can be presented to the user with a simpler configuration.

In the tactile sensation presentation apparatus 1 according to the present embodiment, the control unit 15 may input a composite pulse, which is a combination of the first voltage pulse and the second voltage pulse, to the vibration unit 13. With this configuration, a period of time for which vibration is given to the user can be shortened to a period of time substantially equal to the natural period T1.

In the tactile sensation presentation apparatus 1 according to the present embodiment, a composite pulse may be configured as a single pulse. When two voltage pulses are input to the vibration unit 13, for example, a time at which a second voltage pulse is input to the vibration unit 13 might need to be adjusted in accordance with the displacement of the operation surface or the like. When a composite pulse is configured as a single pulse, however, a time at which a second voltage pulse is input to the vibration unit 13 need not be adjusted in accordance with the displacement of the operation surface or the like. With this configuration, a more realistic clicking feel can be presented to the user with a simpler configuration.

In the tactile sensation presentation apparatus 1 according to the present embodiment, the control unit 15 may input the second voltage pulse to the vibration unit 13 such that the first voltage pulse and the second voltage pulse become linearly symmetrical to each other with a time at which the displacement of the operation surface changes from the maximum value to the minimum value or from the minimum value to the maximum value as an axis of symmetry. With this configuration, as described above with reference to FIG. 19, vibration stimulation given to the user can be increased while shortening a period of time for which the vibration stimulation is given to the user to about twice as long as the natural period T1.

In the tactile sensation presentation apparatus 1 according to the present embodiment, the control unit 15 may input the second voltage pulse to the vibration unit 13 such that the first voltage pulse and the second voltage pulse become point-symmetric to each other with a time at which the displacement of the operation surface becomes zero as a point of symmetry. With this configuration, as described above with reference to FIG. 20, vibration stimulation given to the user can be increased while shortening a period of time for which vibration is given to the user to about ½ of the natural period T1.

The drawings for describing the embodiments of the present disclosure are schematic diagrams. Dimensions, ratios, and the like on the drawings do not necessarily match those in reality.

Although embodiments of the present disclosure have been described on the basis of the drawings and the examples, note that those skilled in the art can make various variations and alterations on the basis of the present disclosure. Note, therefore, that such the scope of the present disclosure also includes such variations and alterations. The function of each component, for example, may be rearranged without causing a logical contradiction, and a plurality of components or the like may be combined together or further divided.

All of the components described in the present disclosure and/or all of the disclosed methods or all of the steps in the process may be combined in any manner unless corresponding features are mutually exclusive. Each of the features described in the present disclosure can be replaced by an alternative feature that serves for the same, equivalent, or similar purpose, unless explicitly denied. Each of the disclosed features, therefore, is just an example of a comprehensive series of the same or equivalent features, unless explicitly denied.

The embodiments in the present disclosure are not limited to any specific configuration according to one of the above-described embodiments. The embodiments of the present disclosure can be expanded to all the novel features described in the present disclosure or a combination thereof, all the novel methods or the steps in the process described or a combination thereof.

For example, in the above-described embodiments, a composite pulse has been described as a combination of the first voltage pulse and the second voltage pulse for the sake of description. It should be understood, however, that, insofar as any composite pulse having the above-described features is input to the vibration unit 13, the effects produced in the present disclosure can be produced without inputting a composite pulse that is a combination of the first voltage pulse and the second voltage pulse to the vibration unit 13.

For example, the first voltage pulse and the second voltage pulse have rectangular shapes in the above-described embodiments. The first voltage pulse and the second voltage pulse, however, are not limited to rectangular shapes. For example, the first voltage pulse and the second voltage pulse may have a shape of triangular waves, half-sine waves, or Gaussian waves, or a combination of these.

For example, in the above-described embodiments, the first electrical pulse is the first voltage pulse, and the second electrical pulse is the second voltage pulse. The first electrical pulse, however, is not limited to the first voltage pulse. The second electrical pulse is not limited to the second voltage pulse. For example, when a current signal is employed as the electrical signal input to the vibration unit 13, the first electrical pulse may be a first current pulse, and the second electrical pulse may be a second current pulse. In this case, polarity of the current pulses are, for example, a positive current or a negative current, whichever the current pulses change.

For example, in the above-described embodiments, the tactile sensation presentation apparatus 1 is configured such that, as illustrated in FIG. 5, the displacement of the operation surface first changes in a positive direction when a positive voltage, such as V1, is input to the vibration unit 13. The tactile sensation presentation apparatus 1, however, may be configured such that the displacement of the operation surface first changes in a negative direction when a positive voltage is input to the vibration unit 13.

For example, in the above-described embodiments, the electrical device in the present disclosure has been described as the tactile sensation presentation apparatus 1. The electrical device in the present disclosure, however, is not limited to the tactile sensation presentation apparatus 1. For example, the electrical device in the present disclosure may be an electrical device including an actuator that employs pneumatic, hydraulic, or steam pressure.

In the present disclosure, terms such as "first" and "second" are identifiers for distinguishing the corresponding components. The components distinguished with the terms such as "first" and "second" in the present disclosure may exchange the numbers thereof. For example, the first voltage pulse may exchange "first" for "second", which are identifiers, with the second voltage pulse. The identifiers are simultaneously exchanged. Even after the exchange of the identifiers, the components are still distinguished from each other. Identifiers may be removed. Components from which identifiers have been removed are distinguished from each other by reference numerals. The identifiers such as "first" and "second" in the present disclosure are not intended to be used as a sole basis for interpretation of order of the components or presence of an identifier with a smaller number.

REFERENCE SIGNS 1 tactile sensation presentation apparatus (electrical device)
10 display unit
11 contact detection unit
12 pressure detection unit
13 vibration unit
14 storage unit
15 control unit
20 housing
21 first insulator
22 upper cover
23 second insulator
30 display
30A display area
31 touch sensor
31a touch surface
32 strain gauge sensor
33 piezoelectric element
I1 to I5 step input
P1, P3 first voltage pulse (first electrical pulse)

P2, P4, P5, P6, P7, P8 second voltage pulse (second electrical pulse)
S1 to S9 composite pulse
T1, T2 natural period
TI1 time
W1, W2, W4, WS1, WS3, WS4 pulse width
W3 overlap width
WA1 to WA19 vibration waveform
sp1 point
t0 to t18 time

The invention claimed is:

1. An electrical device comprising:
a vibrator that, when receiving an electrical signal, vibrates a vibration target; and
a controller that inputs a composite pulse, which is a combination of a first electrical pulse and a second electrical pulse, to the vibrator,
wherein the first electrical pulse is a signal that causes the vibration target to vibrate,
wherein pulse width of the first electrical pulse is a period of time from the input of the first electrical pulse to the vibrator until displacement of the vibration target becomes maximum,
wherein the second electrical pulse is a signal that offsets the vibration of the vibration target caused by the first electrical pulse,
wherein the composite pulse is configured as a single pulse, and
wherein the controller adjusts pulse width of the composite pulse such that a maximum value of a second wave of a vibration waveform of the vibration target achieves a preset ratio with respect to a maximum value of a first wave.

2. The electrical device according to claim 1, wherein the pulse width of the first electrical pulse is a period of time half as long as a natural period of a vibration system including the vibration target.

3. The electrical device according to claim 1, wherein polarity of the second electrical pulse is the same as polarity of the first electrical pulse.

4. The electrical device according to claim 1, wherein pulse width of the second electrical pulse is a period of time half as long as a natural period of a vibration system including the vibration target.

5. The electrical device according to claim 1, wherein pulse width of the composite pulse is a period of time equal to a natural period of a vibration system including the vibration target.

6. The electrical device according to claim 1, wherein the controller inputs, to the vibrator, a composite pulse that is obtained by superimposing a part of the first electrical pulse and a part of the second electrical pulse upon each other.

7. The electrical device according to claim 6, wherein pulse width of the composite pulse is smaller than a period of time equal to a natural period of a vibration system including the vibration target.

8. The electrical device according to claim 1, wherein the vibrator includes a piezoelectric element,
wherein the first electrical pulse is a first voltage pulse, and
wherein the second electrical pulse is a second voltage pulse.

9. The electrical device according to claim 1, wherein the first electrical pulse has a rectangular shape,
wherein the second electrical pulse has a rectangular shape.

10. A method for controlling vibration, the method comprising:
inputting a composite pulse, which is a combination of a first electrical pulse and a second electrical pulse, to a vibrator that, when receiving an electrical signal, vibrates a vibration target; and
adjusting pulse width of the composite pulse such that a maximum value of a second wave of a vibration waveform of the vibration target achieves a preset ratio with respect to a maximum value of a first wave,
wherein the first electrical pulse is a signal that causes the vibration target to vibrate,
wherein pulse width of the first electrical pulse is a period of time from the input of the first electrical pulse to the vibrator until displacement of the vibration target becomes maximum
wherein the second electrical pulse is a signal that offsets the vibration of the vibration target caused by the first electrical pulse, and
wherein the composite pulse is configured as a single pulse.

* * * * *